US012802685B2

(12) United States Patent
Taylor-Sullivan

(10) Patent No.: US 12,802,685 B2
(45) Date of Patent: Nov. 17, 2026

(54) ARTIFICIAL SPEECH PERCEPTION PROCESSING SYSTEM

(71) Applicant: Michael Taylor-Sullivan, Portland, OR (US)

(72) Inventor: Michael Taylor-Sullivan, Portland, OR (US)

( * ) Notice: Subject to any disclaimer, the term of this patent is extended or adjusted under 35 U.S.C. 154(b) by 207 days.

(21) Appl. No.: 18/397,908

(22) Filed: Dec. 27, 2023

(65) Prior Publication Data

US 2024/0221735 A1 Jul. 4, 2024

Related U.S. Application Data

(60) Provisional application No. 63/478,091, filed on Dec. 30, 2022.

(51) Int. Cl.
*G10L 15/183* (2013.01)
*G10L 15/30* (2013.01)

(52) U.S. Cl.
CPC ............ *G10L 15/183* (2013.01); *G10L 15/30* (2013.01)

(58) Field of Classification Search
USPC ........................................................ 704/1–504
See application file for complete search history.

(56) References Cited

U.S. PATENT DOCUMENTS

| | | | | |
|---|---|---|---|---|
| 9,484,014 | B1 * | 11/2016 | Kaszczuk | G10L 13/086 |
| 10,997,970 | B1 * | 5/2021 | Rafii | G06N 3/08 |
| 11,763,797 | B2 * | 9/2023 | Barra Chicote | G10L 13/00 704/258 |
| 2020/0365137 | A1 * | 11/2020 | Barra Chicote | G10L 13/00 |
| 2021/0097976 | A1 * | 4/2021 | Chicote | G06N 3/0442 |
| 2022/0245574 | A1 * | 8/2022 | Cella | G06Q 10/087 |
| 2024/0221735 | A1 * | 7/2024 | Taylor-Sullivan | G10L 15/30 |

* cited by examiner

*Primary Examiner* — Marcus T Riley
(74) *Attorney, Agent, or Firm* — McCoy Russell LLP

(57) ABSTRACT

Systems and methods are herein provided for an artificial speech perception processing system. In one example, an artificial speech perception processing system comprises a waveform computer-encoding engine configured to generate referent code and metadata, an utterance harvesting process, and an administration including an installed base configured to test the referent code and metadata against the installed base.

8 Claims, 17 Drawing Sheets

ARTIFICIAL SPEECH PERCEPTION PROCESSING SYSTEM

CROSS REFERENCE TO RELATED APPLICATIONS

The present application claims priority to U.S. Provisional Application No. 63/478,091 entitled "ARTIFICIAL SPEECH PERCEPTION PROCESSING SYSTEM", filed on Dec. 30, 2022. The entire contents of the above-listed application is hereby incorporated by reference for all purposes.

BACKGROUND

There is a need for global content directories of authentic sound perception in the acoustic AT space. Unfortunately, in terms of attaining a global linguistic database, existing diverse technologies comprising ineffective and non-biomimetic-derived, directly, or remotely, includes NLP systems et al, which are attempting to capture limited: sound, utterances, and other psychoacoustic entities.

For example, this cognitive simulation memory tool answers and services a multitude of eHealth, CS, AT, and IT communication problems today. The present invention is a unique example of bio digital twin technology that simulates the cognitive process for sound; in other words, an artificial transduction of physical sound into sound memory travelling to the human cochlear nuclei in living brainstems. The engine is a segmented part of a three-part system. The integrated system provides new i/o connectivity to existing NLP assistive technologies, deep learning, and data approaches notwithstanding as artificial automated-tool referent code & meta data for user corpora. The intention of artificial cognitive speech processing is designed to function in real time as an assistive design. The bio digital twin system routes signs and simulations of sound waves into qualified artificial time-code words for cataloging which will always be integrated in an artificial embedded system. In other words, the bio digital twin system simulates procedural biomimicry transmutation of asynchronous auditory entities. In particular, the bio digital twin application relates to the creation of language modal access of a global acoustic memory directory as digital corpora. The proposed model of bio digital twin simulation of auditory memory process is one of digital transmutation of auditory physics of the cochlear nuclei processes in living brainstems.

The integration of parts in the present application an artificial method, an artificial method product, and waveform computer-artificial coding engine, wherein, as a process for artificial speech perception is bio digital twin in theory i.e., wherein it models the listening function of the brain's memory process. The intake of new analog waveforms into the cochlear organ are sorted by wavelengths and intensities and translated along auditory system nerves as non-waveform pulsates along with carrier bioelectric pulsates to the primary auditory cortex, which is situated on the temporal lobe at both sides of the brain. The connectivity of the primary auditory cortex and associative auditory areas notwithstanding, are operationally key to the computer artificial encoding of the auditory heuristic experience. These artificial codes, as an analogy, comprise either: artificial substitution, artificial codes substituted by pre-existing memory pulsates; suppression, artificial codes are discarded; arbitration, artificial codes arbitrated into higher cortical networked pulsates in brain recruitment process; mental formation, if codes are completely original, codes are passed along the pulse-train in the heuristic web as an artefact memory. This is believed to be representative for animals with an organ of Corti as part of their anatomy.

Social anthropology and linguistic anthropology illustrate the dependence on language development in cultures over the millennia. *Homo sapiens* benefit from brain development in the cortical regions of the cerebrum and thus have developed, over millennia, prototypical words, or words as lexical utterances for otherwise unclassified artifacts of memory. Cultural linguistics and shared knowledge accelerated because of the assignations of name for artefact development.

At this time the sound processing at the mesencephalon is not modeled in the present application theory due to its bias to survival messaging and locating functions. The theory applied in this application is for linguistics purposes and not for hearing and reaction events.

The present application presupposes that with its core, wherein as an intelligent agent, is designed to assist: Assistive Technology, Information Communication, Question and Answer Systems, Internet of Things, applied linguistics, Semantic Web, Intelligent Programs; operates, in more than one layer on top of existing or future machine interpreter languages; may provide rich i/o connectivity to ontologies on the semantic web.

The present application may represent a paradigm in taxonomies in the form of global referent code & metadata. In this way the present application planning and mass tasking appeal designs, through architecture integration, may solve the linguistics global referent code & metadata deficit. NLP computational techniques may advance natural language sentences with NLP ontology-assisted programming.

The present application generates an artificial language embedded in memory storage, an artificial method that may benefit AI and concomitant creation as a paradigm shift for information extraction (IE) and discovery of new information relationships.

The present artificial intelligent application operates in integrated global design areas comprising heuristic planning, i.e., deliberation for discovery of new artificial global referent code & metadata; artificial utterance harvesting process and collection of verified time-code words; device engineering of automatic, procedural, analog waveform computer encoding technology; proliferation of global analog waveforms to mine.

An example of this process, in teleological terms, was a methodology used by a prolific contributor to the compilation of word meanings for the building of the Oxford English Dictionary, over a hundred years ago. The contributor devised a systematic tool, called a quire, for keeping track of designated word meanings required by the OED managers in Philology Society. Not unlike the listed quire word or phrase described in the annotation data during the utterance gathering and the subsequent processing. The produced time-code-word is converted to a substitution signified address. This memory address substitutes for the targeted word listed in the quire. The bio digital twin simulation is of the concurrent neural activity that occurs at the cochlear nuclei where the brain's memory process which tests whether the sign from the bio digital twin device, in the form of a memory schema, whether it is recognized in the extant memory or is a new one. There is a heuristic moment as a new word or phrase is chosen for growing new mental formation.

BRIEF DESCRIPTION

This summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

Embodiments illustrate a method system in artificial speech perception processing comprising an association of scholars whose purpose is to deliberate, create, and maintain relevant data collection of operational temporal cognition metadata derived from an artificial utterance harvesting process of utterances of speech. An artificial method and an artificial method product function creates automated artificial tool referent code & metadata corpora for users in data processing systems. Authorized access control is key to deliberation, creation, and maintenance of relevant global artificial referent code & metadata metadata. The association validates and provides access control for all entities contributing speech. Entities executing speech as sayings, phrases, words, and utterances may be by a person, family, or corporate body. Metadata associated with the validated entities are subject to ranking, authenticating for users to benefit from a proven artificial information communication system.

In other illustrative embodiments, a waveform computer artificial encoding engine is provided. The engine may comprise a manifestation as, single board computer, micro processing unit/apparatus, website embedded application, or downloadable application for digital communication systems, cell phone mobile devices notwithstanding. The waveform computer artificial encoding engine produces automatic artificial encoding of acoustic speech. The engine produces artificial substitution code for bio digital twin simulation of speech perception. The processing always implements artificial multiple filter banks that receive amplified signal from transducer along with artificial band pass filter banks wherein isolated acoustic features by bandwidth are differentiated by comparator, addressed and time-coded, merged with requisite metadata independent compiling, the operations outlined above about an artificial method illustrative embodiment.

Representing utterance harvesting process product are illustrative embodiments for speech perception processing are provided. Deliberated utterance harvesting process forms and voice speech contributions are analogous to temporal speech anticipation in linguistic performance between a person, family, or corporate body. Authentication and access control for target speech at a hosted web site comprises application user interface requires a downloadable equivalent, or personal data application device equipped with transducer. Voice speech contributions are received and processed by waveform computer-encoding engine encoder. Real time transfer of utterance harvesting process product and associated operational metadata are inputted back to association, the operations outlined above with regards to each of the waveform computer-encoding engine and an artificial method illustrative embodiment.

Empirical illustrative embodiments wherein support for theory of artificial bio digital twin speech perception processing and temporal cognition of speech perception are linked in behavior are provided, the operations outlined above with regards to the artificial processing system inclusive illustrative embodiment.

These and other features and advantages of the present invention will be described in or will become apparent to those of ordinary skill in the art in view of, the following detailed description of the example's embodiments of the present invention.

BRIEF DESCRIPTION OF THE DRAWINGS

The invention, as well as a preferred mode of use and further objectives and advantages thereof, will be best be understood by reference to the following detailed description of the illustrative embodiments when read in conjunction with the accompanying drawings, wherein.

DETAILED DESCRIPTION

Figure 1:
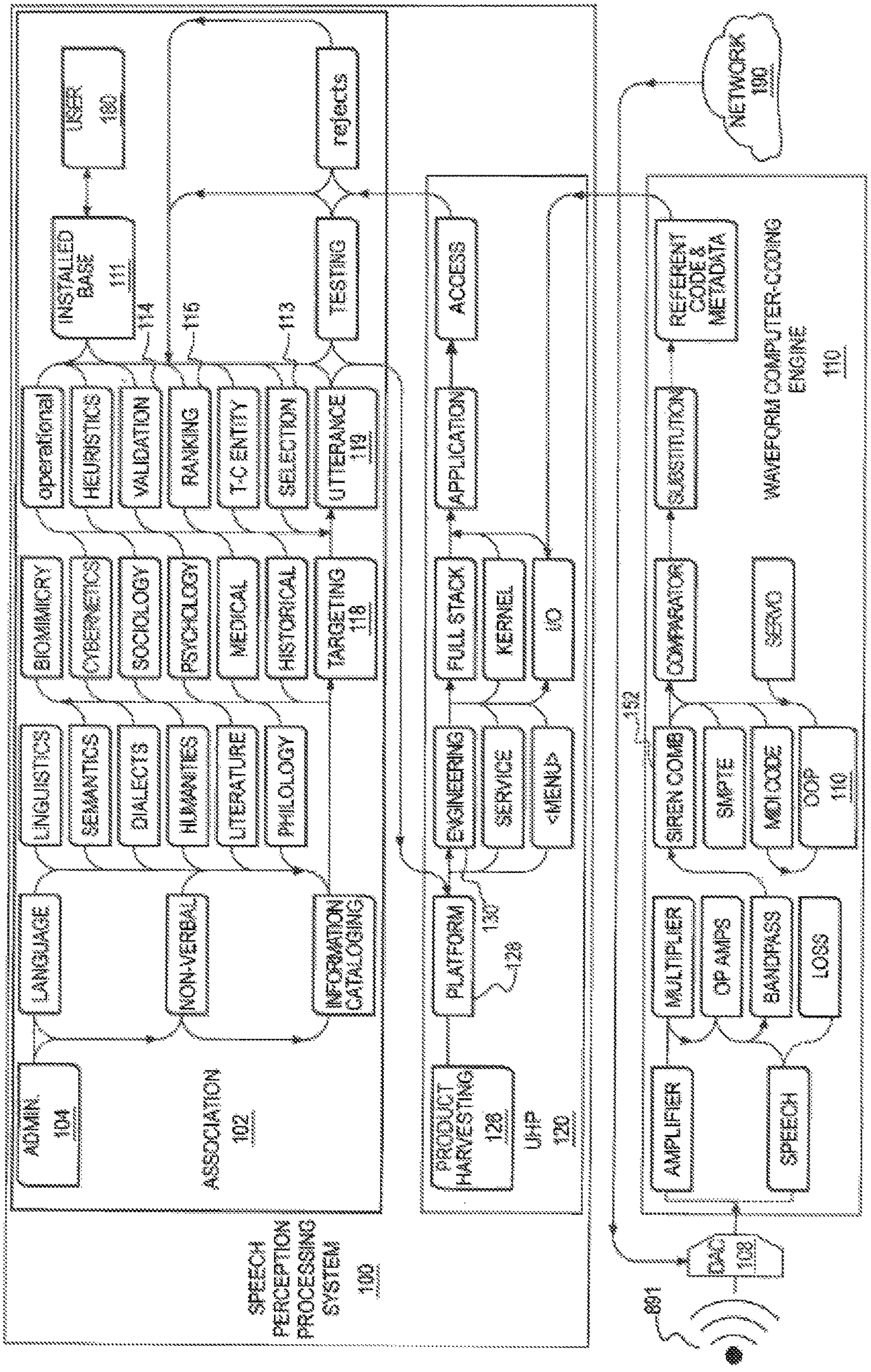
FIG. 1 depicts an artificial speech perception processing system pipeline for processing operational temporal cognition of speech of one illustrative embodiment of architectural integration providing artificial automated tool referent code & metadata and connectivity for users.

The illustrative embodiments provide mechanisms for an artificial speech perception processing system. In particular, the illustrative embodiments provide mechanisms for simulating utterances of speech in such a way that artificial temporal cognition with verified referent code & metadata in memory storage for natural language engine users have exacting metadata to better perform in all information communication realms. The exacting metadata is primarily derived from heuristic access control from the artificial utterance harvesting process function. Automatic artificial simulation in the speech perception process is the sole event-based function which enriches authentically, rather than increasing variability, the corpus of artificial data available to users.

Metadata and associated time-code words available to users in the form of an artificial natural language. This new artificial language becomes a mechanism to accesses the corpus of open un-linked data. Embedded waveform encoder mechanism allows real time access as an assistive platform for users.

The illustrative embodiments provide mechanisms for user goals which may include music searches for melody, rhythm, and performance for un-sampled music forms as low memory 10 kilobyte music minute rate; search for electromagnetic trace for medical data match, spectrogram codes for chemical compounds; searches for inorganic compounds, elements, or radio astronomy; word matching to natural phenomena, e.g., ice melting on glaciers, outwash, crevasse splitting or cocktail shaker;

Other discovery matches may be sought as goals for: speech-to-speech translations by others; search by pathogens, DNA, outbreaks on global referent code & metadata database; animal sound encyclopedic inputs from remote locations with satellite uplinks; identification of generic sounds; image scanning in time-code mode for skim searches, editing movies, videos, and archives; voice recognition and biometrics; hearing aids that translate by speech-to-speech, machine translation; hearing aids that can be tuned to menu acuity, i.e., listening to music vs. prose; resolving environmental sounds; hearing aids analyzing data input for pressure, temperature, electro-conductivity for tinnitus research;

The illustrative embodiments provide mechanisms for user goals also for MIDI applications with enhanced music score translations in environs; menu applications for listening to color, timbre, phrasing; as skimmable data so musical performances can be analyzed; music from animals with auto-translation to music staff; stochastic noises which are skimmable in database; emergency watch dog; listening for earthquake acoustic signals;

Goals may also include finding new understanding for grammar structures in multiple languages; find and apply sound structure to mathematical equivalents; universal language code in lower level programming, or higher level programming; establish stochastic logic language for creating artificial intelligence works; accurate dictation, speech-to-text, command and control systems;

Interspecies communication may also add to conventional goals that the mechanism may provide includes learning aids to fields working with learning disabled people; cybernetic equivalent to stochastic database; modeling of human hearing for reverse engineering and medical advancements.

In accordance with one illustrative embodiment the list above is extended by users in categories included with activity connectivity mechanism.

The term "metadata" refers to association prescribed information that describes the entities of speech for the purpose identification, discovery, selection, use, access, and management; an encoded description of prescribed sayings, phrases, words and utterances to be queued for authority control; the purpose of the metadata is to provide a level of data at which choices can be made as to which resources users wish to view without having to search through massive amounts of irrelevant open un-linked data or highly structured content by others of irrelevant data file sets.

An additional term use for "metadata" refers to information from persons, family, or corporate body derived during the utterance harvesting process phase as part of an artificial method product.

The term "computer" refers to a waveform computer-encoding apparatus as a micro processing unit or single board processor or an application.

The term "operational" refers to any temporal captured and notated moment in time that relates to either a job, task, or paradigm. The documentation is in the form of metadata.

The term "speech" 600 refers to acoustic sound waves derived from linkage to sayings, phrases, words, and utterances 601.

The term "perception" refers to psychoacoustics including both synchronic and diachronic instances in linguistic performances. In the present application background it is the integration of all an artificial method, an artificial method product and waveform computer-encoding parts that are inclusively designed to produce a simulation of the neurophysiological processes, including memory, by which a human listener becomes aware of and interprets external acoustic sound waves derived from linkage to sayings, phrases, words, and utterances.

The term "users" refers to systems which utilize natural language engines and an artificial method for the purpose of information communication and speech technologies. Systems in search of assistive language advancement for the voice recognition space as one example, other examples may include systems with deficient success in command & control reliability.

The term "association" refers to group of scholars whose charge background is to provide in the present application the expertise, management and administration for creation and maintenance of the open un-linked database development.

The term "entity" refers to persons, family, or corporate body. The term also includes sayings, phrases, words, and utterances and waveform computer-encoding paths. In all cases linkage by way of metadata as descriptions are forms of the listings of their various attributes.

The terms “path” and “time-code word” are synonymous and refer to the alpha-numeric address within a memory record for a particular speech event. For example, “path” becomes the object in object-oriented programming and is linked to the metadata and the SMPTE or MIDI time codes.

The term “biomimetic” refers to relating to or denoting synthetic, an artificial method which mimics linguistic performance in general and psychoacoustics in temporal cognition of speech perception in particular.

It should be appreciated that a waveform computer-encoding engine in the present application may provide safety and occupational protection as automatic-tool referent code & metadata for users of cochlear implants with functionality as unassisted and computer mediated.

It should be appreciated that a waveform computer-encoding engine in the present application may provide construction protection for users as mass customization for environmental, industrial, and tinnitus for sound-in-noise work situations where functionality is unassisted, and computer mediated.

It should be appreciated that an artificial waveform computer-encoding engine in the present application may provide artificial automatic-tool referent code & metadata for users with cochlear implant devices as speech emphasis and enhancement computer mediated functionality.

In the diagnostics healthcare and accessories supply the present application may provide automatic-tool referent code & metadata for users with hearing impairments. As enhancements for user hearing aids the waveform computer-encoding engine can provide environmental options as assisted application for audiologists. It should be appreciated that in conventional hearing aid use the linear analog functionality with waveform computer-encoding as an option to class A amplifiers and other amplifiers may also benefit users with hearing sensitivities outside conventional amplifier range.

In other types of enhancement, it should be appreciated that a waveform computer-encoding engine in the present application may provide automatic-tool referent code & metadata for users of automatic dictation for continuous speech where phoneme recognition requires enrollment and use of dictionary corpora.

Also, in voice related enhancement category as command and control, it should be appreciated that the present application always does, by design, provide waveform computer-encoding engine product as automatic-tool referent code & metadata for various enrollment processes employing natural language mechanism. It should be appreciated that automatic-tool referent code & metadata to corpora may be restricted by license of access.

It should be appreciated that a waveform computer-encoding engine in the present application may provide automatic-tool referent code & metadata for users of biometrics and bioinformatics in speech-to-text output as alternative statistical scientific identity and data analysis systems.

A category such as restored hearing for users of cochlear implants or other devices, it should be appreciated that an artificial waveform computer-encoding engine in the present application may provide artificial automatic-tool referent code & metadata as unassisted in vivo digital biologics speech-to-text with use of user interface devices.

It should be appreciated that a waveform computer-encoding engine in the present application may provide automatic-tool referent code & metadata for users of unassisted alert and telephony electromagnetic early warning systems.

In speech-to-text assistive category it should be appreciated that a waveform computer-encoding engine in the present application may provide automatic-tool multi-language referent code & metadata for users. It should be appreciated that automatic-tool multi-language referent code & metadata to corpora may be restricted by license of access.

In speech translation as a service by human assistance category, it should be appreciated that a waveform computer-encoding engine in the present application may provide automatic-tool multi-language referent code & metadata for users. It should be appreciated that automatic-tool multi-language referent code & metadata to corpora may be restricted by license of access.

It should be appreciated that a waveform computer-encoding engine in the present application always provides automatic-tool referent code & metadata for user speech recognition as speech-to-text query functions in natural language applications. It should be appreciated that automatic-tool referent code & metadata to corpora may be restricted by license of access.

Also, it should be appreciated that a waveform computer-encoding engine in the present application always provides automatic-tool referent code & metadata for user speech recognition as speech-to-text network functions in natural language applications. It should be appreciated that automatic-tool referent code & metadata to corpora may be restricted by license of access.

It should be appreciated that a waveform computer-encoding engine in the present application always provides automatic-tool referent code & metadata for user speech recognition as speech-to-text assisted functions in natural language applications. It should be appreciated that automatic-tool referent code & metadata to corpora may be restricted by license of access.

It should be appreciated that a waveform computer-encoding engine in the present application always provides automatic-tool referent code & metadata for any proprietary artificial hearing device in the speech-to-text category and functions as unassisted speech recognition in natural language applications. It should be appreciated that automatic-tool referent code & metadata to corpora may be restricted by license of access.

It should be appreciated that a waveform computer-encoding engine in the present application may provide automatic-translation of analog music into music notation.

In the command-and-control category, it should be appreciated that a waveform computer-encoding engine in the present application may provide music performance analysis in assisted and unassisted functions for recording analysis, editing, input and output, and player uses.

It should be appreciated that a waveform computer-encoding engine in the present application may provide automatic-tool referent code & metadata for the purpose of speech synthesis as text to speech or command for declarative engines.

It should be appreciated that a waveform computer-encoding engine in the present application may provide automatic-tool referent code & metadata for the purpose of speech synthesis as command unassisted or assisted recording, editing, input and output, or players.

The aforementioned terms embody some of the various aspects of the illustrative embodiments of the present application as it relates to the hearing sciences space. They are not intended to be exhaustive of all the various potential uses for the present invention. Other illustrative embodiments are to follow in the Detailed Description below.

It should be appreciated that throughout the detailed descriptions below the term "mechanism" will be used to refer to elements of the present invention that performs various operations and functions, and the like.

In this present application the mechanism validates speech perception processing in the document by system integration comprising cataloging an artificial method for heuristic planning, utterance harvesting process with access control metadata harvesting, automation of waveform computer-encoding, and authentication ranking for memory storage, an operational artificial language for open un-linked data in the database. The mechanism with its an artificial method, its device for automated-tool referent code & metadata engine, and its authentication association is unlike any mechanism in the state of the art of artificial intelligence.

That said, the mechanism of the present application is designed to fill in the missing link, as it were, for the speech recognition space, machine learning, and artificial intelligence notwithstanding. The bio digital twin bias comprises: the integrated artificial method, the artificial method products, and the artificial automated-tool referent code & metadata, and the global artificial referent code & metadata terms. The voice recognition space and IE each benefit from such a mechanism through the anticipation bias which that requires the practice of intentional front-end loading of contextual phrases, sentences, words, or utterances in an operational, heuristic manner with time equivalents with jobs, tasks, and paradigms yet to become.

Since the present invention represents a paradigm shift in data harvesting for linguistic communications and speech perception processing, it is important to understand that in FIG. 1 the term "association" 102 has a historical counterpoint in the systematic making of the Oxford English Dictionary "OED". Whereas then, the cognitive meanings, terms, phrases, uses, manifestations, expressions, and utterances, as sounds notwithstanding were for the development, harvesting, and publishing in printed volumes all words in the English language lexicon, here too, in this present application an artificial method, engine, and an artificial method product, as sound representations in an artificial bio digital twin system of record are for the development, harvesting, and storage. In other words, the "association" 102 in this present application is for intents and purposes and is an analogous simulation as the managers performed in the Royal Philology Society years ago. Here too, linguistic communication-wise, it should be appreciated that the administration 104 always applies a bio digital twin temporal cognitive approach whereby submission and obedience to intentional artificial method, an artificial method product, and artificial engine integration, wherein, as an artificial process for speech perception is based on theory. Empirical data and implications are discussed further on in one or more illustrative embodiments to follow.

The present invention is predicated on sigetic-semiology, a theory of temporal speech perception and cognition processing as an integrated system that produces artificial substitution time-code words for the purpose of providing automatic artificial tool referent code & metadata. The sigetic-semiology is presented in more detail with respect to FIG. 6.

Beginning with FIG. 1, a block diagram of a speech perception processing system 100 is shown. The speech perception processing system 100 is communicably and/or operably coupled to a waveform computer. The waveform computer is an artificial encoding engine 110 that processes individual utterances 119 in obedience to the biomimicry heuristic database. The he artificial process starting at the instance of intake at the waveform transducer 108 of speech 891 or from network 190 through to metadata and alphanumeric merge and provides the anticipated discovery an artificial method product from utterance harvesting process (UHP) 120. The artificial encoding engine 110 may be an artificial speech perception processing engine or a waveform computer-encoding engine.

An example of how the written appeal can viewed as an artificial method a century ago is as follows, the selected target entities 118: sayings, phrases, words and utterances with access and authority control are processed automatically. The submitted target sayings, phrases, words, and utterances in the crowd search is processed with the artificial encoding engine 110. Just like the OED experienced with the discoveries from the mailed in responses to appeal letter campaign, in effect, contributors supplied masses of heuristic responses to the scriptorium while making the celebrated dictionary. In other words, this present invention enables new discoveries, as artificial automated-tool referent code & metadata essential too more efficiently expand the corpora of global acoustic content available to an ever expanding number of users 180.

The next portion, as will follow, in the same illustrative embodiment for the artificial integrated system of FIG. 1 artificial product harvesting 126, platform 128, and engineering 130 are administered by the association 102. The administration 104 may provide authority and access control over entities for the artificial product harvesting 126. The artificial product harvesting 126 may be analogous to the building of the Oxford English by means of "catchword" indications on slips of paper to be filled in with citations of quotes, book titles, editions, page numbers, and the like. In this way, so too, analogously, similar entity metadata may be compiled by the artificial encoding engine 110 of the speech perception processing system 100. As in the former "scriptorium", the repository for English word uses for validating via validation module 114, ranking via ranking module 115, and selection via selection module 113, the processes from the speech perception processing system 100 and the artificial encoding engine 110 in the present invention become stored as final records, e.g., installed database 111. The installed database 111 may be a "stochastic database" and may be the digital publishing correlate in the form of an artificial open un-linked data representing artificial alphanumeric simulations of sounds of utterances, as artificial referent codes, with all the validated authoritative metadata notated for users 180 of all stripes in the electronic information communication space.

Figure 2:
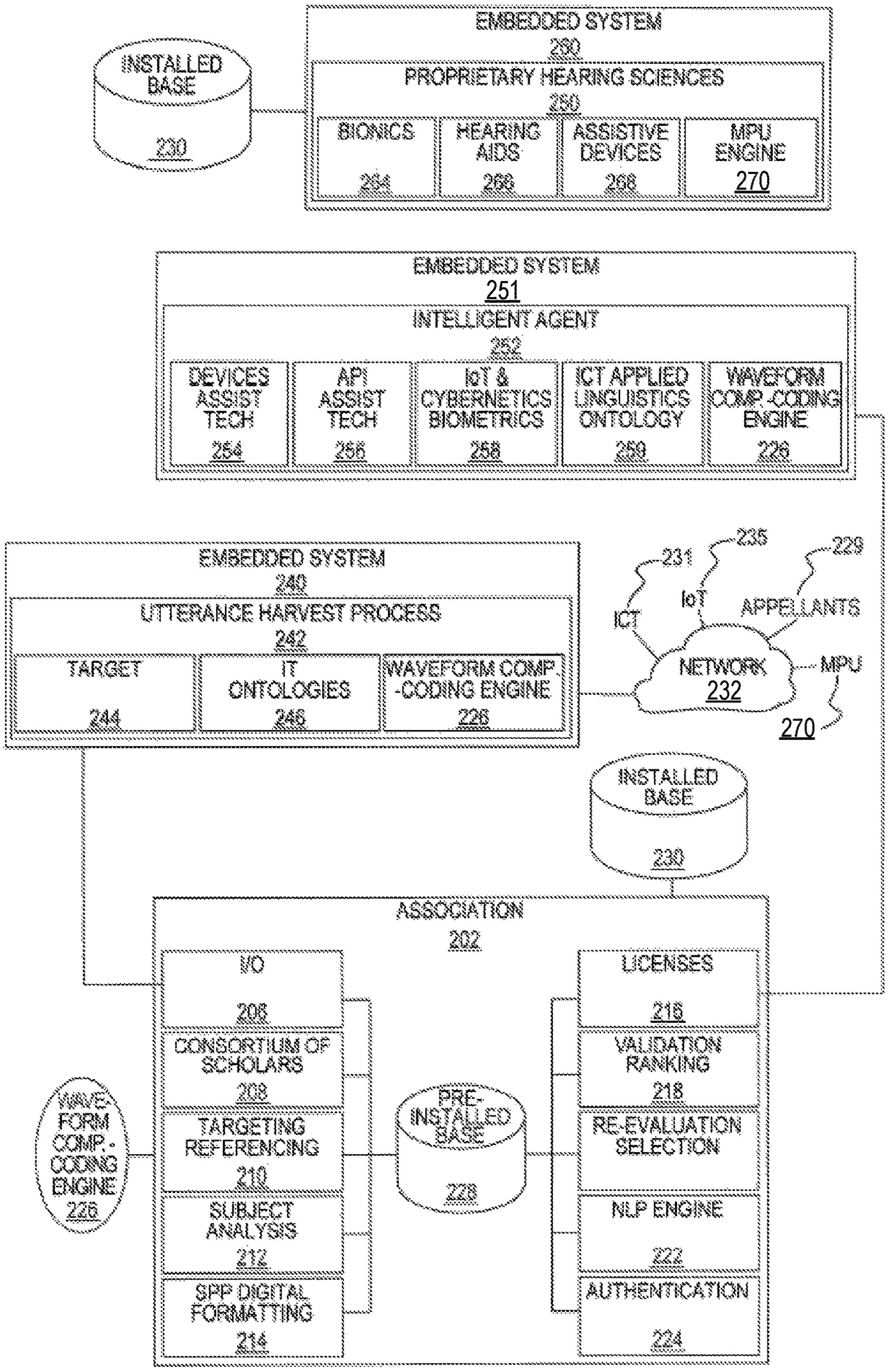
FIG. 2 depicts a schematic diagram of one illustrative embodiment of artificial speech perception processing system as an integrated artificial embedded system associating embedded artificial proprietary hearing devices, embedded intelligent agent, embedded artificial utterance harvesting process, and embedded artificial planning and authoring in accordance with one illustrative embodiment.

FIG. 2 depicts a schematic diagram of one illustrative embodiment of speech perception processing system, in one example the speech perception processing system 100 described with respect to FIG. 1. The speech perception processing system may include an installed base 230, which may be the installed database 111 of corpora of FIG. 1. The speech perception processing system may include access license to users 180 of the speech perception processing system 100, as well as an association 202 (e.g., the association 102 of FIG. 1) for planning and application of speech perception processing an artificial methods and the artificial product harvesting 126, while not explicitly depicted in FIG. 2. The speech perception processing system of FIG. 2 may also include a waveform computer-encoding engine 226, which may be the artificial encoding engine 110 of FIG. 1. The artificial methods, artificial product harvesting 126, and waveform computer-encoding engine 226 may function as they associate with embedded proprietary hearing device system 260. The embedded proprietary hearing device system 260 may be in communication with the installed base 230 and may comprise proprietary hearing sciences 250 such as bionics 264, hearing aids 266, and assistive devices 268. The embedded proprietary hearing device system 260 may also comprise or otherwise be communicably coupled to a microprocessing unit 270. Within association 202, embedded system 240 may be within input and output 206 and embedded system 251 may be within licensing 216. It is important to understand that in the function as intelligent agent 252 of embedded system 251, licensing 216 may be performed solely by the association 202 and that safety and security of corpora is secured in the embedded waveform computer-encoding engine 226 (e.g., via event 152 as depicted in FIG. 1) via encapsulation involving alpha-numeric code and associated heuristic metadata.

All artificial speech perception processing is digitally formatted via formatting module 214 for use with natural language processing engine 222. The use of language in the planning and deliberation maybe be natural language processing when subject analysis 212 is employed for entity identification, cataloging, and target referencing 210 for the UHP 120.

The association 202 may be populated by scholars 208 of various fields including specialists in library information sciences, experts in semantic web development, IT, and website architecture, operations, and design to name a few.

The authority record of entity referent code & metadata is designated in authentication 224 just like a bibliographic record and extends to target 244 identities in the utterance harvest process 242. Associated with a target 244 (e.g., selected target entities 118) is machine-readable computer-encoding of various elements including access authority. The process may have one or more referent code & metadata standards to guide catalogers, indexers and the like. It should be appreciated that the artificial created referent code & metadata from the artificial speech perception processing system 100 along with its formatting an authority record in the form of a metadata statement, or some other form of resource description is established in the target 244.

Once the utterance is captured and "time-stamped" from the waveform computer-encoding engine 226, the referent code & metadata undergoes validation and ranking 218 and may receive additional statements attending the artificial alpha-numeric substitution time-code word and those additional statements may describe more fully how the entity was communicated as part of the original metadata.

UHP 242 may demand website design 246 that encompasses ever expanding web and IT ontologies, mobile devices, and the like which may support transducer capabilities for embedded microprocessing unit 270 to harvest targets 244 and contributions by appellants 229 via the network 232. It should be appreciated that the embedded system 240 within input and output 206 has secure and access control established by utterance entity authority control. The network 232 may ingest further contributions from Information Communication Technology 231, IoT and cybernetics and biometrics fields 235, and the microprocessing unit 270.

In the present invention the association scholars may assess the selection of entity sayings, phrases, words, and utterances from a sweep of anticipation, a forward-looking benefits appraisal, for contemporary user trends, issues, and applications integrated with web platforms and integrated network opportunities. It should be appreciated that the artificial speech perception utterance harvest process provides entities directly from appellants 229 in the same web of global connected systems and platforms. Systems with license to use the embedded artificial speech perception processing system which are potentially poised to benefit may include embedded intelligent agent 252 categories such as: assistive device technologies 254, assistive application software 256, IoT and cybernetics and biometrics fields 258, and Information Communication Technology "ICT" and the like in emerging linguistic ontologies 259, all of which are not intended to be exhaustive of all the possible intelligent agent applications for the present invention.

Figure 6:
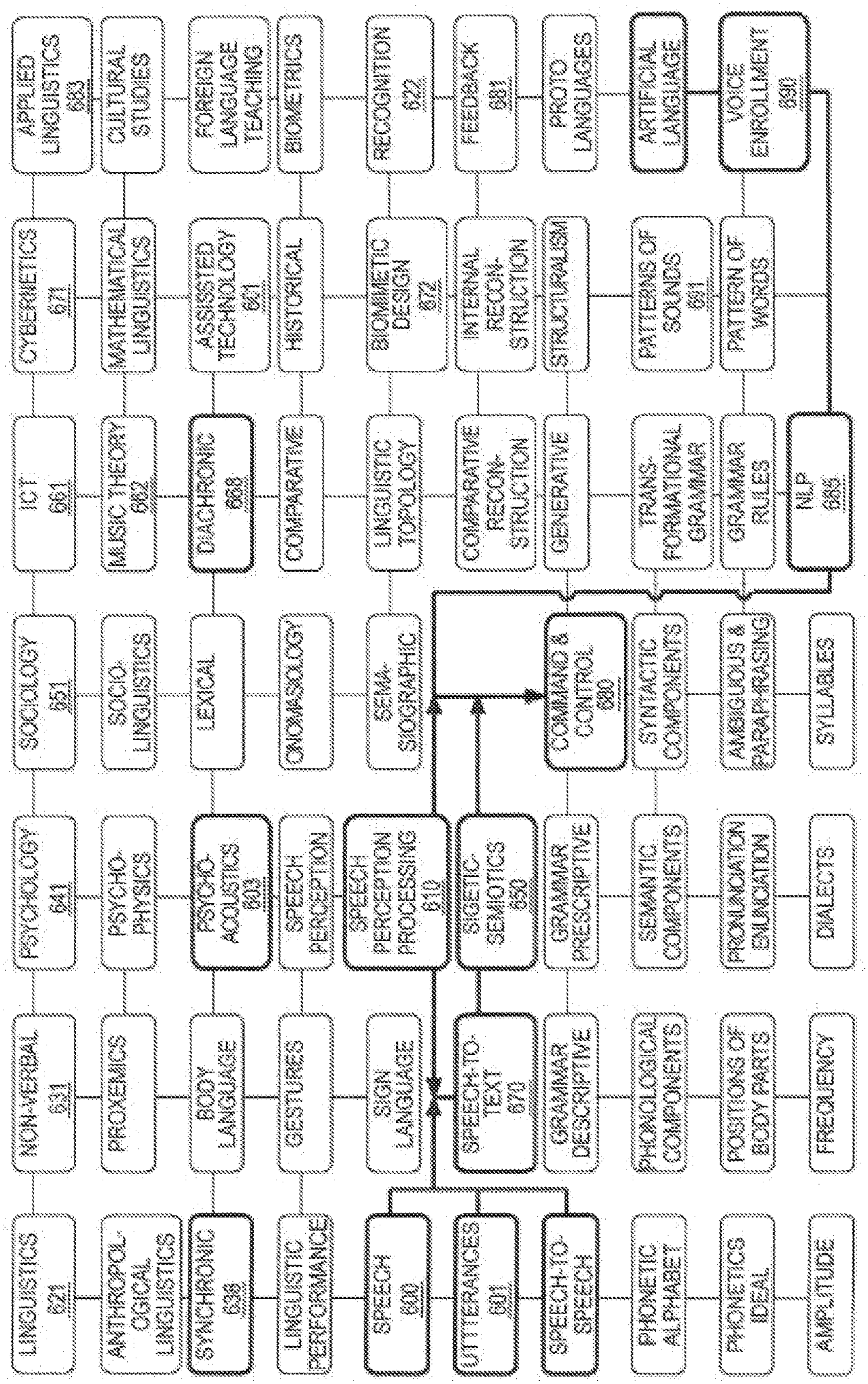
FIG. 6 is a block diagram of an example fit for an artificial speech perception processing system correlating with linguistics communication categories in accordance with one illustrative embodiment.

The association scholars while providing deliberative and administration function will always be managing stacks 228 as a "pre-installed artificial base" containing all entities as sound or as linguistic corpora whether synchronic or diachronic in status of the artificial SPP, as is further described with respect to FIG. 6. The stacks 228 may control any subsequent publishing to with into the final record repository, e.g., installed base 230, or "artificial installed base", for artificial referent code & metadata, otherwise known to some users as artificial automatic-tool content (see IBM description of corpora & corpus).

It should be appreciated that retrieval of artificial referent code, metadata, and artificial operational processing for administration is natural language "NLP" and "OOP" and the like throughout the selection, and It should be appreciated that digital string or strings of artificial code that describes or contains entities, entity identities, and entity access authority control may as a process constitute a new class of object oriented programming, "OOP", nonexclusive, may be implemented along with natural language processing "NLP" equivalent containing strings of data in the nascent stacks 228.

The creation of diachronic entities the in the embedded system 240 are derived from transactions at the network 232 and generated by the waveform computer-encoding engine 226 during the UHP 242.

The embedded proprietary hearing device system 260 may represent a proprietary hearing system which may be employed as an integrated waveform computer-encoding engine (e.g., waveform computer-encoding engine 226) with licensed real time access to integrated assistive device speech-to-text function with connectivity to referent code & metadata, for example from installed base 230. Hearing aids 266 and bionics 264 may be examples of enhanced enclosure apparatuses featuring a bio digital twin design which may be integrated with transducer innovation and user interface assistive displays that may provide benefits to some users in the hearing sciences. A list, not intended to be exhaustive, of application types for speech-to-text are further described with reference to FIG. 4.

It should be appreciated that in the Artificial Intelligence and Assistive Technologies industries the command category of the speech recognition space reigns as the principal market activity center and in the present application its artificial speech perception processing system may provide solutions such as saying, phrase, word, and utterance identity, cognitive accuracy, cognitive content needed to those as well as other categories, command notwithstanding: commerce, local, navigation, and information. It should be appreciated that lesser market activity is invested in Information Communication Technology "ICT", Hearing Sciences, and the like or humanitarian types in general. The need for advancement in linguistics performance and cognition are intrinsic to the AI assistive industry pursuits.

Figure 3:
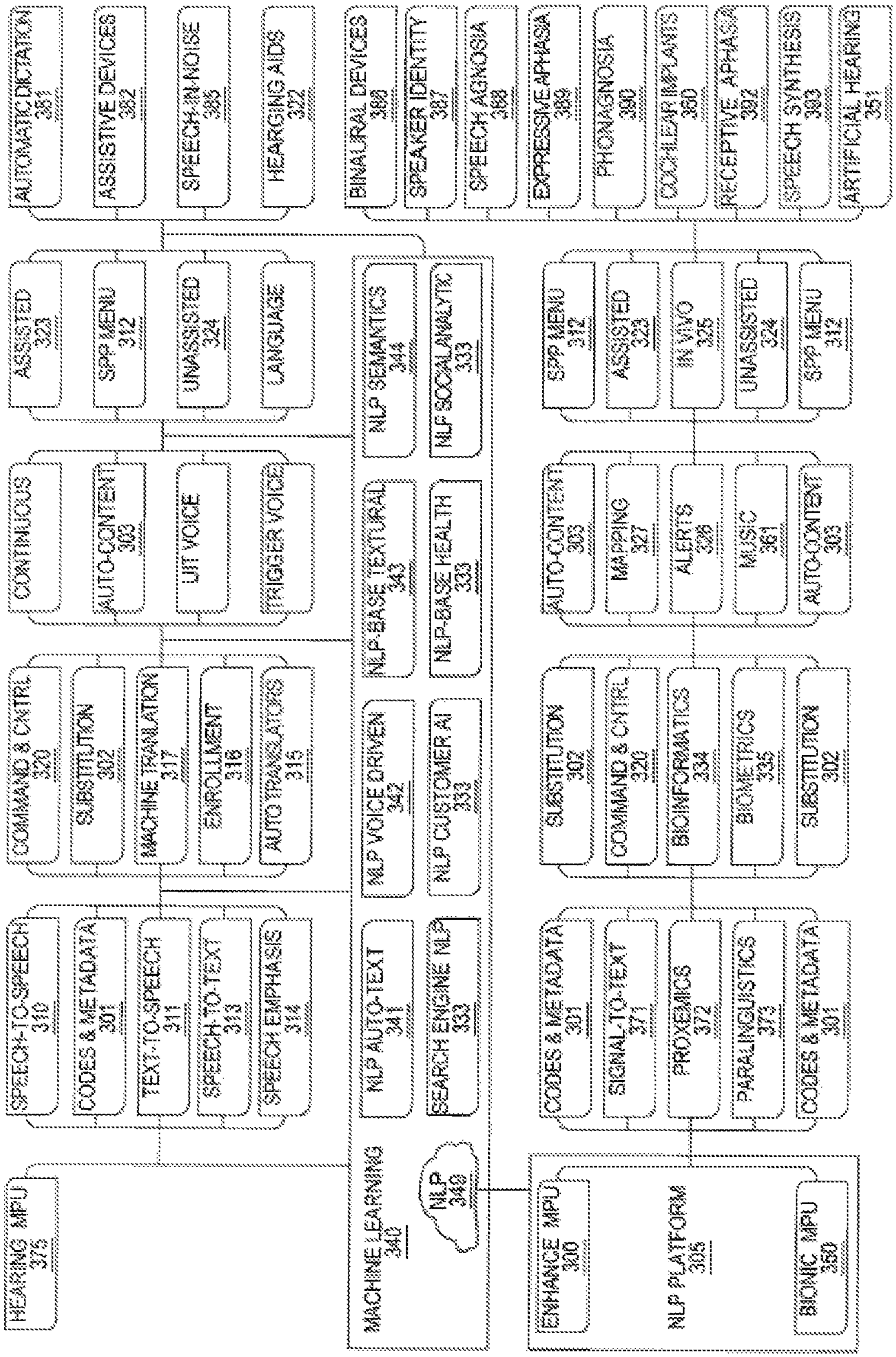
FIG. 3 is a block diagram of an example waveform computer-encoding engine platform for hearing deaf, hearing-impaired, and diverse-lingual users of embedded speech perception system in accordance with one illustrative embodiment.

FIG. 3 depicts example platform capabilities of a waveform computer-encoding engine, such as waveform computer-encoding engine 226 of FIG. 2, for the hearing deaf, hearing-impaired, and diverse-lingual users of one or more of the systems described above. The enhancement category command and control 320 may provide assisted translations through machine processes of NLP and OOP program languages as integrated function with waveform computer-encoding engine 226 and/or artificial encoding engine 110. Assist devices technologies 254, as described above, and the like may benefit as licensed users of the referent code & metadata in accuracy improvements in voice recognition and speech-to-text as unassisted functions.

It should be appreciated that in the present invention an embedded system 251 for artificial speech perception processing with accompanying licensed use may provide unassisted artificial intelligent function for continuous speech-to-text in enrollment automatic dictations and command and control voice recognition at voice portals and the like.

Apparatus enclosures, such as hearing aids 322 and the like, may benefit from the present invention as an embedded intelligent agent licensed system. It should be appreciated that conversational speech, speech in noise, impaired hearing, and deafness share a variability in sound loudness, sound perception, sound cognition, and mixed-source environments.

A menu 312 as an association administered and designed user interface or similar function may provide enhancement, safety, and restoration at the user interface including the option to operate a switch for adjusting the selection modes for referent code & metadata i/o operation and still maintain artificial automatic tool content control. As the installed base 230 of FIG. 2 develops beyond nascent state with UHP 120 processing the above functionality with saying, phrase, word, and utterance, growth in identity, cognitive accuracy, and cognitive content will expand over time. The use of menu 312 may be part of the embedded system 251, for example at the intelligent agent 252.

As a non-limiting example, a machine learning engine 340 may be communicably and/or operably coupled to a hearing microprocessing unit 375. The machine learning engine 340 may comprise a natural language processing module 349. The machine learning engine 340 may employ one or more machine learning architectures, including but not limited to deep learning networks and the like. Various engines or modules, including a natural language processing auto-text module 341, a natural language processing voice driven engine 342, a natural language processing base textural engine 343, a natural language processing semantics 344, and various search engines 333, including a natural language processing search engine, a natural language processing customer AI, a natural language processing health base, and a natural language processing social analytic may be incorporated in the machine learning engine 340.

A natural language processing platform 305 may be a portion of the natural language processing module 349. The natural language processing platform 305 may comprise an enhancement microprocessing unit 300 and a bionic microprocessing unit 350. Both the microprocessing units may include or otherwise connect to metadata. The metadata may include codes and metadata 301, signal-to-text 371, proxemics 372, paralinguistics 373, substitution 302, command and control 320, bioinformatics 334, biometrics 335, auto-content 303, mapping 327, alerts 326, music 361, SPP menu 312, assisted 323, in vivo 325, and unassisted 324, as non-limiting examples.

A hearing microprocessing unit 375 may also be coupled to the machine learning engine 340. The hearing microprocessing unit 375 may output or be linked with various applications, including speech-to-speech 310, codes and metadata 301, text-to-speech 311, speech-to-text 313, and speech emphasis 314. These various applications may together or individually be fed through one or more of command and control 320, substitution 302, machine translation 317, enrollment 316, and auto-translation 315. Output from the v Data from the natural language processing platform 305, the machine learning engine 340, and the hearing microprocessing unit 375 may be applied to various applications. For example, outputs from the machine learning engine 340 and the hearing microprocessing unit 375 may be applied to automatic dictation 381, assistive devices 382, speech-in-noise 385, and/or hearing aids 322, as non-limiting examples. As another example, outputs of the natural language processing platform 305 may be applied to binaural devices 386, speaker identity 387, speech agnosia 388, expressive aphasia 389, phonagnosia 390, cochlear implants 360, receptive aphasia 392, speech synthesis 393, and artificial hearing 351.

It should be appreciated that due to the anticipated breadth and abundance of references, descriptions, language origins, and other linguistic information listed in the referent code metadata from UHP 120 and installed base 111, metadata as a resource will provide abundant temporal cognitive content to be availed for menu 312 design and engineering 130 functionality that complies with the prescribed auto-processing functionality the artificial encoding engine 110 is designed to perform.

In the present application the language translation category with menu 312 may benefit biologics "in vivo" computer-mediated and unassisted functionality for cochlear implants 360.

It should be appreciated that the present invention applies referent code & metadata in language translation processing for music performance, notation, MIDI code, and the like, included is synthetic speech.

Figure 4:
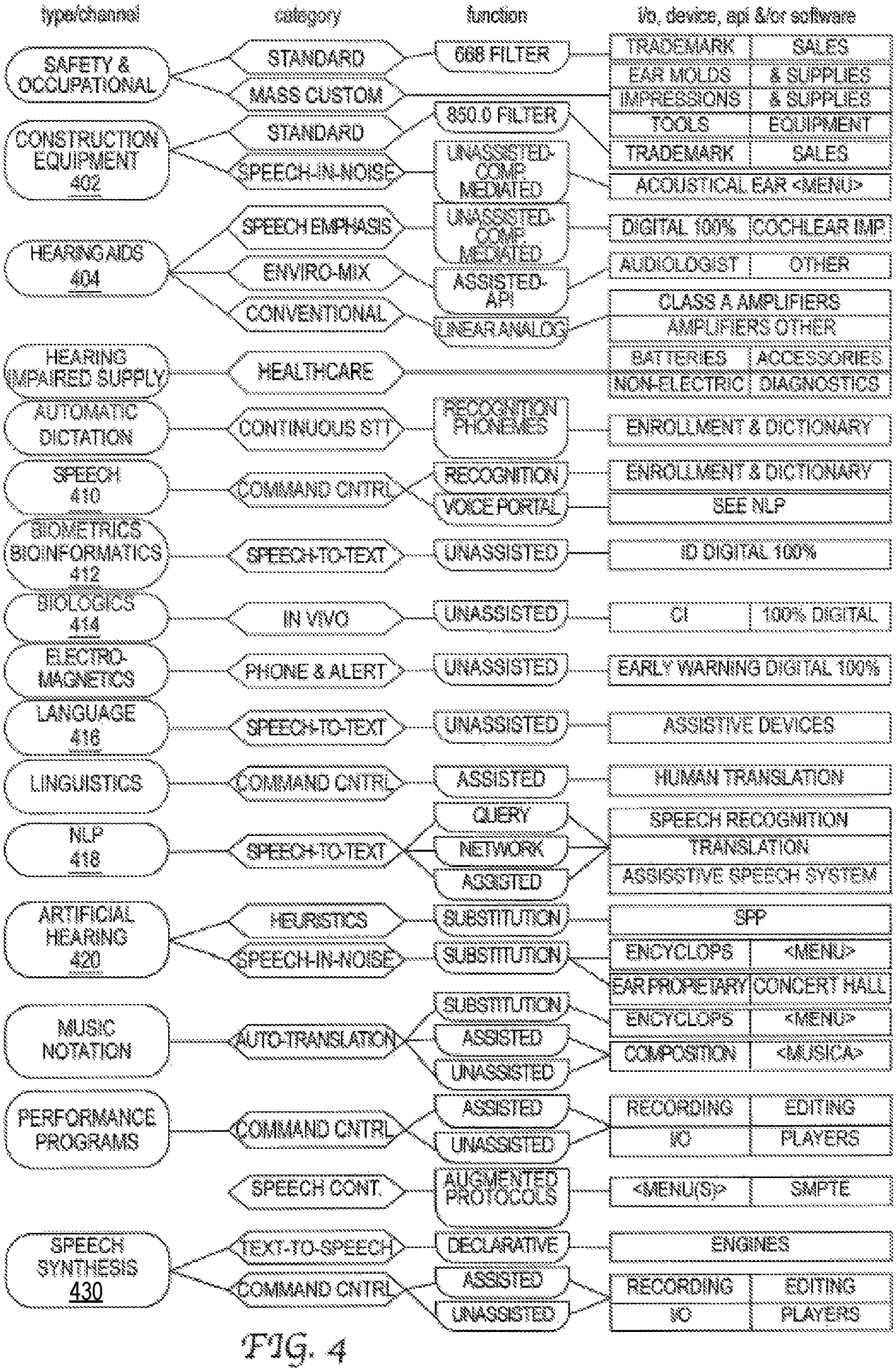
FIG. 4 is a flow chart outlining example decision tree selection channels, categories, functions, and implementations for hearing deaf, hearing-impaired, and diverse-lingual users of an embedded artificial speech perception system in accordance with one illustrative embodiment.

FIG. 4 depicts decision tree selection channels, categories, functions, and implementations for hearing deaf, hearing-impaired, and diverse-lingual users of embedded system 251, and intelligent agent 252. It should be appreciated that market activity described may benefit in the one or more applications and the like: language translation in restoration functions, command and control in enhancement functions of the enhancement microprocessing unit 300, and standard apparatuses in protection functions.

As a non-limiting example, types or channels are shown in a first column of FIG. 4, categories of the channels are shown in a second column, functions for some of the categories are shown in a third column, and application (e.g., input/output, device, API, and/or software) for the functions are shown in a fourth column. The types or channels may include construction equipment 402, hearing aids 404, speech 410, biometrics/bioinformatics 412, biologics 414, language 416, natural language processing 418, artificial hearing 420, and speech synthesis 430, among others, as non-limiting examples. Other types or channels may include music notation, linguistics, electromagnetics, and more. Each type or channel may correspond to one or more categories. For example, hearing aids 404 may correspond to speech emphasis, environmental mix, and conventional, while language 416 corresponds to speech-to-text.

Figure 5:
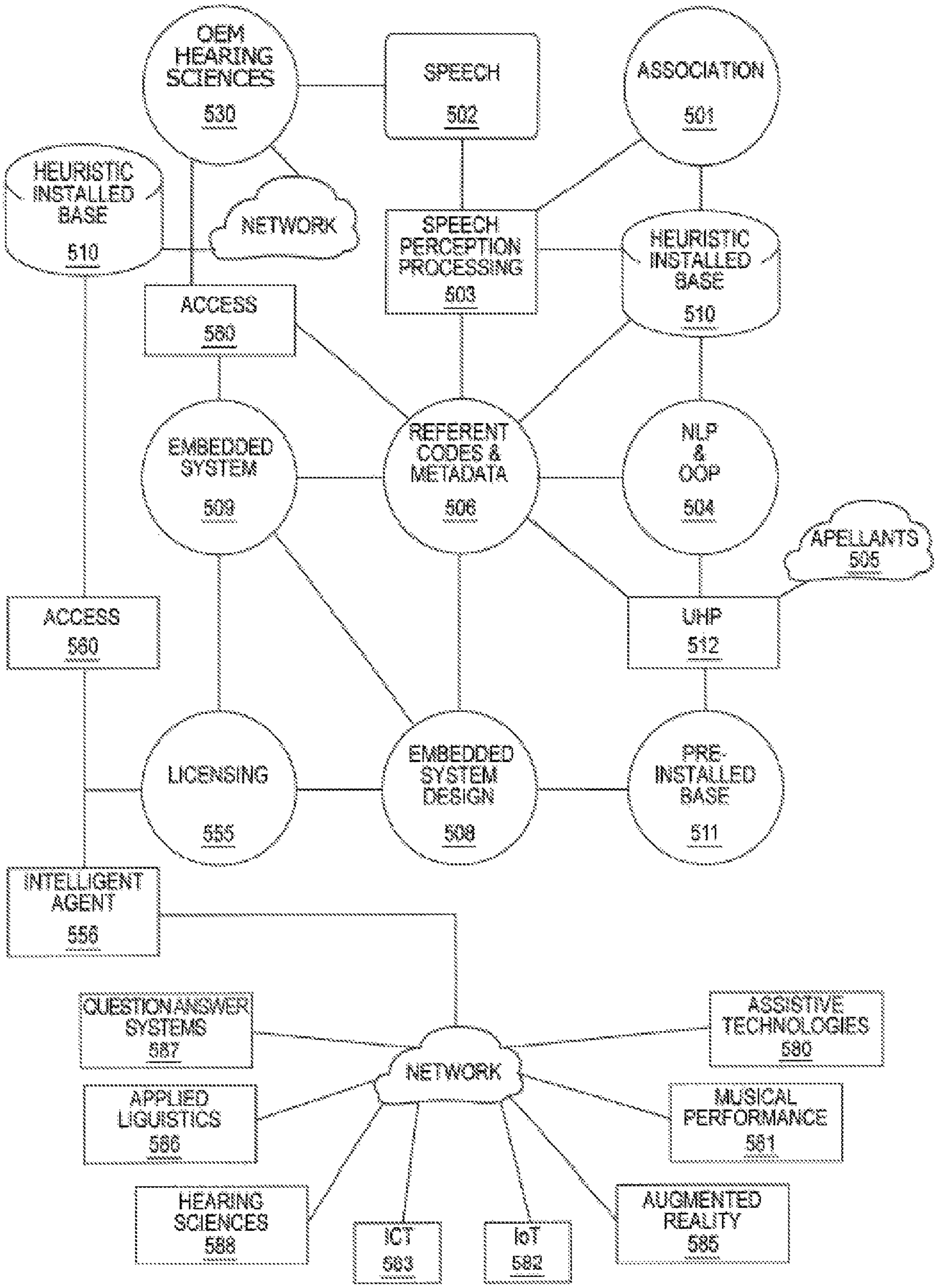
FIG. 5 is a block diagram of an example activity map delineates intelligent agent accessibility through embedded system licensing for users and system memory storage and utterance harvesting process function in accordance with one illustrative embodiment.

FIG. 5 depicts an activity map between various components of the speech perception processing system herein described. An access 560 may be utilized by intelligent agent 556 in obtaining real-time benefits from heuristic installed base 510 in the form of relevant temporal cognitive content, i.e., referent code & metadata 506, such as command and control at voice portals in assistive technology 580 applications and the like, including musical performances 581, augmented reality 585, IoT 582, ICT 583, hearing sciences 588, applied linguistics 586, and question/answer systems 587 In the activity map as an example, OEM hearing sciences 530 may have direct access to speech 502 as embedded functionality with waveform computer-encoding and referent code & metadata through real-time online accessibility as authorized or proprietary, and the like. Users on the other hand, may obtain licenses to obtain similar benefits. As an example, referent code & metadata 506 may be accessed by embedded system 509 (e.g., embedded system 251) and embedded system design 508) as well as UHP 512, natural language processing and object-oriented processing 504, access 560, and speech perception processing 503, which is accessed by speech 502. The embedded system 509 may be accessed by licensing 555 as previously described above. The UHP 512 may be accessed by pre-installed base 511 and by appellants 505. As previously described, the speech perception processing 503 and heuristic installed base 510 may be accessed by or otherwise connect to association 501.

The detailed discussion addresses distinctions between synchronic 638 and diachronic 668 opportunities in speech perception processing depicted in block diagram FIG. 6. It should be appreciated that if an event is considered "temporally cognitive", ergo the event is synchronic, one-time signal or entity then, in the context of the present invention, the referent code & metadata may supply the missing link, linguistics-wise, benefitting NLP systems, modules, and the like wherein all functions are diachronic mechanisms. That is, NLP function engines with evolved and developed language or diachronic 668 in the machine translation and operate with ambiguities, travel recreation, flight scheduling, hotel destinations, and retail product commerce and the like notwithstanding. For example, the present invention of artificial speech perception processing and installed base wherein referent codes & metadata disambiguate diachronic processing of voice enrollment 690 as an assistive process, the opportunity with the present application provides synchronic 638 isomorphic codes in the form as validated references wherein benefit command and control applications 680. The use of the present invention may effectively supply psychoacoustic 603 nuances wherein real-time events artificial speech perception processing 610 events may benefit information communication technology broadly in information extraction and intelligent agent applications. Derivation of links from the block diagram, not intended to be exhaustive, of relationships which otherwise would not be obvious are examples such as embedded systems for intelligent agent applications and proprietary hearing sciences, for example intelligent agent 252 and proprietary hearing sciences 250 respectively, wherein benefit command and control 680, notwithstanding the success of human translation. At the time of the present invention, command and control applications suffer accuracy and reliability of continuous speech recognition wherein dependent on voice enrollment 690. The embedded artificial speech processing system products and operational real-time referent codes and metadata access, shown as bold lines and bold arrows, bridge synchronic event codes, "entities," to diachronic formal programming wherein opportunities make for improved accuracy and reliability for the user.

For example, entities such as linguistics 621, non-verbal communication 631, psychology 641, sociology 651, ICT 661, cybernetics 671, and applied linguistics 683 may be processed via the speech perception processing system herein described. As an example, synchronic 638 which may include speech 600, utterances 601, and speech-to-speech may be fed through speech-to-text 670, which may connect to sigetic semiotics 650 and to control applications 680. The speech perception processing 610, which may include data of psychoacoustics 603, may also send data to the control applications 680 as well as to natural language processing 685 and to voice enrollment 690. Other processing entities and metadata, such as recognition 622, feedback 681, biomimetic design 672, music theory 662, and patterns of sounds 691 may also be included.

A second example wherein hearing sciences technology, such as assistive devices 268, may utilize assistive devices for enhanced hearing. It should be appreciated that natural language processing 418 utilized in the information communication technology is poised to benefit in making more accurate and reliable machine translations such as speech-to-text 670. The depiction of the linguistics fabric, like a mosaic of cohesive memories are processed and drawn as a "fit" of interwoven branches of disciplines and concepts which comprise the present invention as it relates to some examples of benefits of artificial speech perception processing 610. It is important to understand the nuance that speech perception, a functioning temporal cognition of events, are like memories of other kinds of feelings and impressions. Psychoacoustics notwithstanding, speech perceptions defy exact replication. Replications containing word descriptions and references convey the "experience" as does music, speech, and other acoustical experiences as time-stamped substituted codes having fulfillment metadata. Referent code & metadata 506 are the "experience" and the "use" contributed to the UHP 120 that is simulated in the bio digital twin approach to artificial speech perception processing system.

Figure 7:
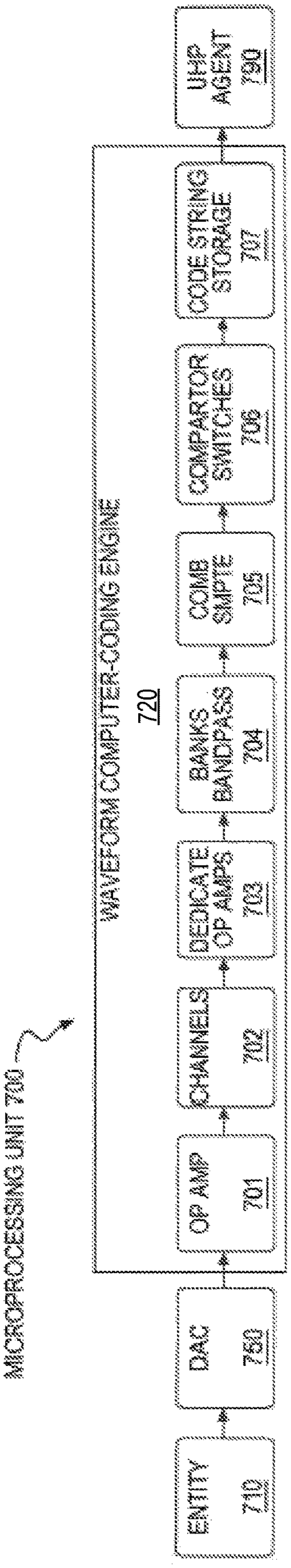
FIG. 7 is a block diagram of an example waveform computer-encoding engine that automatically implements received incoming signals in accordance with one illustrative embodiment.

The utterance, i.e., "entity" conversion to artificial strings of coding is depicted in the block diagram, FIG. 7. The key to achieving referent code & metadata automatically for real-time benefits as a corpus utilizes a microprocessor unit 700 and comprises a series of operations that processes source acoustical speech 710 or other entity that may be analog sound transmitted thorough an independent transducer 750 (e.g., a DAC). The first operation of an engine 720 amplifies input acoustical sound 701 from the independent transducer 750 and enables replication to multiple channels 702 to carryover impulse waveforms by way of dedicated op amps 703 corresponding to each bank of predetermined array of frequency bandpass filters 704. The array of bandpass filters 704 may be stepped in frequency ranges.

Society of Television and Motion Picture Engineers "SMPTE" time coding or MIDI time coding operation of timestamping and frame rate determination, as shown in FIG. 7, can be controlled correspondingly to bio digital twin dictates 130. It is important to understand that frame rates are part of the comb operation 705 as a pre-function processing, i.e., parts of the signal are simultaneously preselected, time-stamped, and operated by comparator function and subsequent switch-on function 706 controlled in an electrical servo system, and the like. Artificial code strings are stored in code string storage 707 as artificial addresses "substitutions" for waveform qualia, i.e., "entity" determined by association targeting (e.g., selected target entities 118). Artificial code strings are accessible to a UHP agent 790, such as UHP 242, intelligent agent 556, or the like depending on the access authority and licensing 216.

It must be appreciated that referent codes & metadata are created to be automated-tool generated entities from an artificial speech perception processing system, such as artificial speech perception processing system 100, for linguistics applications and the like, and, it also must be appreciated that qualia of the "utterance" conveyed in intensity, pitch, and timbre are target components of targeted speech entities described by the metadata for representing the phenomenon as captured by the engine 720 in successive steps by the bandpass filters 704, the comb operation 705, and the switch-on function 706 respectively. The same may apply equally for applications for music performance, music notation, and MIDI.

Figure 8A:
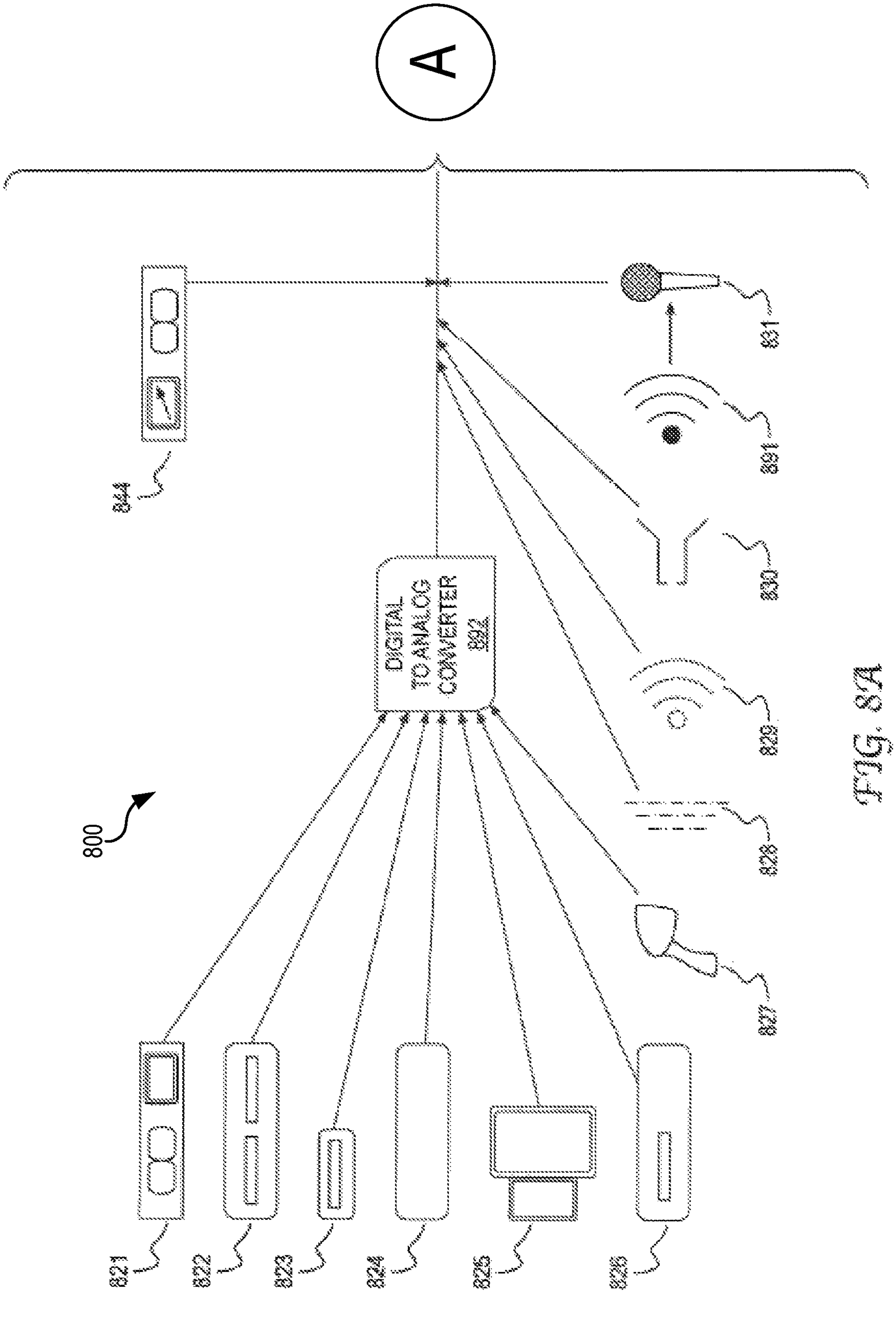
FIG. 8A and FIG. 8B depict a schematic diagram of one illustrative embodiment of waveform computer-encoding engine in accordance with one illustrative embodiment.
Figure 8B:
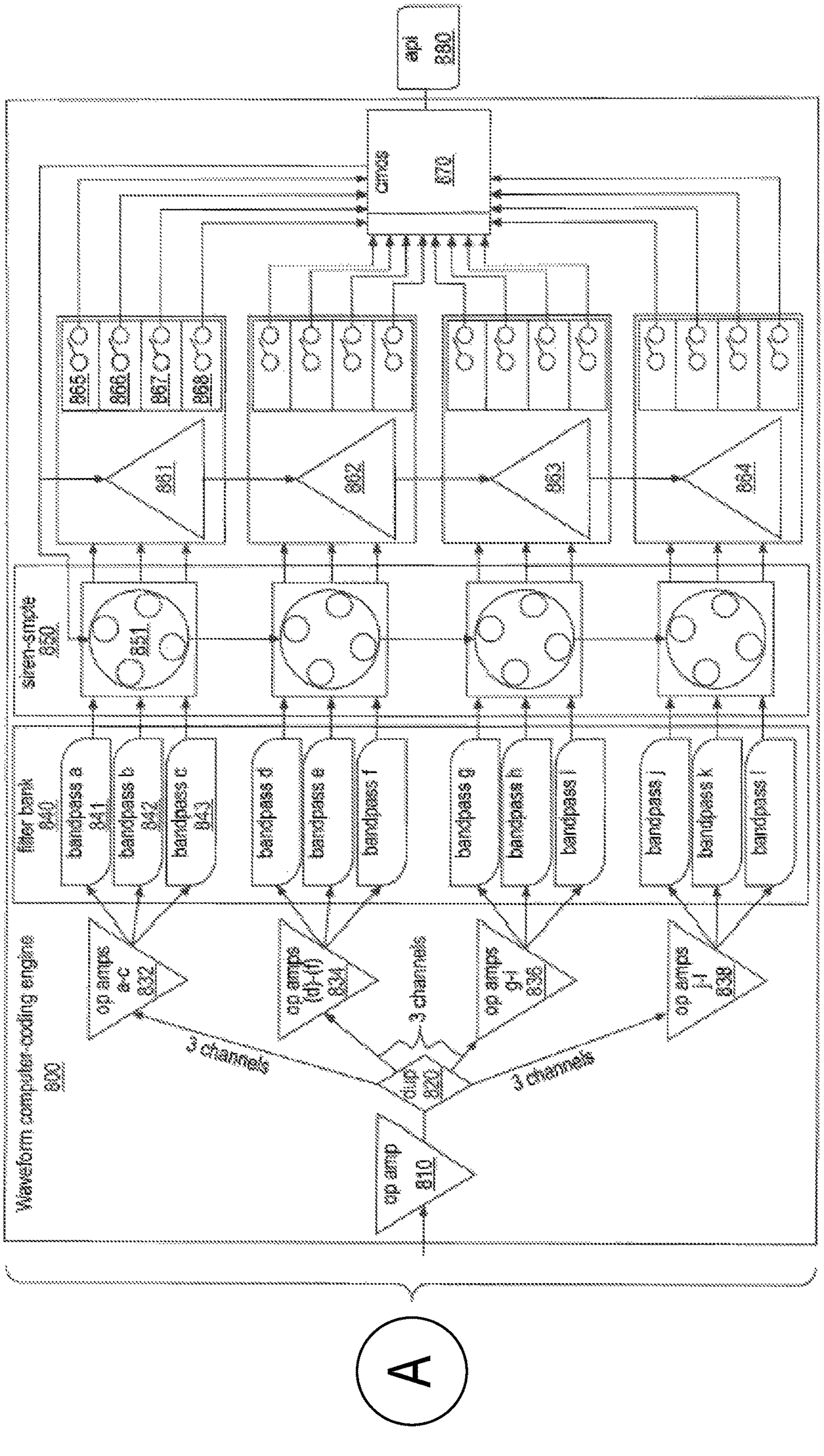

FIG. 8A and FIG. 8B depict a schematic diagram of one illustrative embodiment of a waveform computer-encoding engine 800. While FIGS. 8A and 8B are presented separately, they depict various components of the same waveform computer-encoding engine 800 and as such will herein be described together. For example, FIG. 8A shows inputs to the waveform computer-encoding engine 800 and FIG. 8B shows hardware thereof. The waveform computer-encoding engine 800 operates as a part of a larger system of artificial speech perception processing for the purpose of which is creation of artificial string code or artificial strings of codes of artificial substitution or substitutions from sayings, phrases, words, and utterances as entities that always are prescribed for its process by the association 102. The description of deliberation and selected target entities 118 are a part of the integration process for the purpose of disambiguation of variables with an artificial substitution code process which embodies verifiable and authentic production of artificial entities as possible. Wherein for purposes other than speech 891 in FIG. 8A disambiguation is of benefit to users with systems that comprises: digital bioinformatics 821; analog bioinformatics 844; compact disc music players 822, and the like 823; IoT transmission devices 824; text-to-speech applications 825 in assistive technologies; information communication technologies "ICT" 826; digital scanners 827; each may have either embedded or external digital-to-analog converters sending signals to operational amplifier 810 in the waveform computer-encoding engine 800. Wherein direct signal transmission devices to operational amplifier 810 comprises: x-ray 828; sonar 829; radar 830; and microphones 831.

"An analogous simulation of the temporal cognitive hearing process" may best describe the illustrative embodiment figures FIG. 8A and FIG. 8B in spirit for its design principles founded on theory are bases on which the engine parts are envisioned. Speech 891 as waveform is uttered into digital analog converter 892 and picked up and amplified by operational amplifier 810 for duplication 820 transmission of signal triad each of channels for four sets of op amps 832, 834, 836, and 838. These dedicated op amps send amplified signals to twelve parts of filter bank 840 which comprises arrays of passband filters of there each of three different frequency range in hertz. An example of an array served by op amps in 832 would be bandpasses 841, 842, and 843 exclusively. For simplicity of this multi-layered system of operations, let's say that if the same aforementioned array of filters process the amplified signals correspondingly, as shown by circuit arrows, to the time-stamp and comb frame rate electronic servo, here in this example, the operation 851 may comb out discontinuous portions of a predetermined window of the duplicated and filtered signal are time-stamped at each window and all signal portioned windows passed on to a dedicated comparator switch-on operation, per the example array of filters, this comparator 861, performs an artificial function analysis of combed signal and determines switch-on address appropriate, in this operation only one gate switch fires of the available four gate switches 865, 866, 867, and 868 and as is true for this example in FIG. 8B so is the same for each filter bank array and corresponding other comparators 862, 863, and 864, only one switch-on gate for each for a total of four for the entirety of the engine diagram FIG. 8B at siren-SMPTE 850 window event accumulating during the entirety of the artificial entity harvest event and stored at storage 870. Again, the artificial code strings are accessible to application 880, such as UHP 242, intelligent agent 556, or the like depending on the access authority and licensing 216.

It should be appreciated that at the present invention it may serve the operation at comparators like comparator 861 to function with a null set, fourth switch-open gate to represent the absence of any parts of the original signal and this may reveal an artificial method for discerning and marking "silence".

Those of ordinary skill in the art will appreciate that the input devices in FIG. 8A and hardware depicted and FIG. 8B may vary depending on the implementation. Other internal hardware or peripheral devices may be used in addition to, or in-place of the hardware depicted in FIG. 8B. Also, the process of the illustrative embodiments FIG. 8B may be applied to a single board waveform computer-encoding system of another configuration, or another mentioned previously, without departing from the spirit and scope of the present invention.

Figure 9:
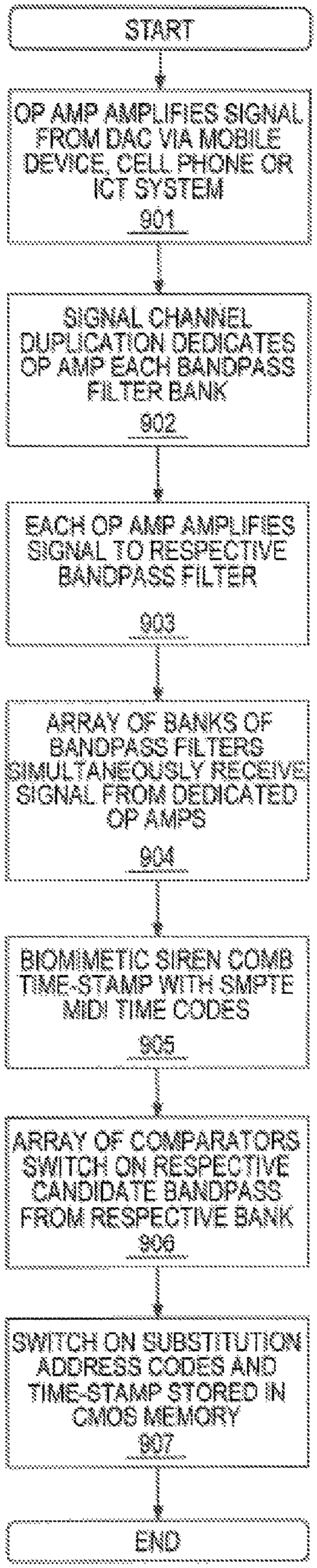
FIG. 9 is a flow chart outlining an example operation for waveform computer-encoding engine processing of analog voice signal into time-code words and associative metadata for independent compiling in accordance with one illustrative embodiment.

FIG. 9 is a flow chart outlining an example operation for computer-encoding waveform speech 891 as sayings, phrases, words, and utterances into referent code & metadata 506. The operation outlined in FIG. 9 is shown for an embodiment in which the operations are part of a pre-processing or ingestion of target entities 118 predetermined for artificial product harvesting 126, validation and ranking 218 of an installed base corpus 230 for use in an artificial speech perception processing system.

That is, the operations in FIG. 9 are always performed in an embedded waveform computer-encoding engine 226 function to capture qualia as part of the entity anticipated to be representative of temporal cognitive "speech perception" selection 113. That is, the operations for FIG. 9 comprise procedural, i.e., automated sequential steps for the purpose of disambiguation of digital referent code and metadata. In the present invention, disambiguation comprises predetermining entity, predetermining bandwidth frequency ranges, predetermining frame rate of window substitution coding, and predetermining comparator limits.

It must be appreciated that operations in FIG. 9 are always executed as an activity as an embedded device or application by instances comprising UHP 512, intelligent agent 556, proprietary hearing sciences 530, and the like.

As shown in FIG. 9, the operation starts by operational amplifier receiving signal from DAC 702 in (step 901). The signal representing "speech" as analog waveform sound representing entities is amplified for duplication (step 902) into multiple channels which each will be dedicated to corresponding operational amplifiers (step 903) associated with an array of banks of bandpass filters (e.g., within the filter bank 840) all each upon simultaneously receive signals from dedicated operational amplifiers (step 904) senses replicated signals that are transmitted into (step 905) an electronic servo (e.g., siren-smpte 850) combs the signal into discontinuous portions of a predetermined window time lengths and stamps a temporal SMPTE and MIDI time codes for each window. An array of comparators (step 906) with each a switch-on resultant operation processing incoming series of streaming window signals corresponding to bank of bandpass filters that were processed from (step 905). It is important to understand that in the present configuration of FIG. 8B schematic drawing the above steps are occurring as a four-way set of comparators processing twelve pre-processed signal sources originating from channel duplication 820. Digital substitution of waveform signal or its window is created the moment switch-on operations instantiate (step 906) and the strings of codes and timestamps are stored (step 907) in CMOS memory.

Figure 10:
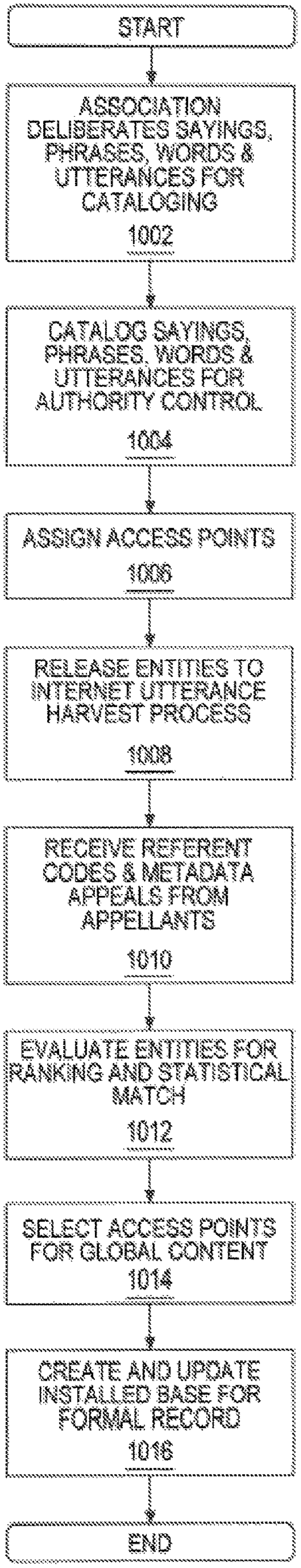
FIG. 10 is a flow chart outlining an example operation of association deliberation, planning, analysis, verification of utterance harvesting process questionnaires, controlling metadata access, and receiving, verifying, authenticating and deliberation of bio digital twin cognitive code outcome ranking, uploading perception processing product expressed in natural language text as unstructured, open and unlinked data to a catalog memory as a formal record in accordance with one or more illustrative embodiments.

FIG. 10 is a flow chart outlining an example of an artificial method of planning, deliberation, selection of sayings, phrases, words, and utterances for cataloging. The method comprises associating deliberates sayings, phrases, words, and utterances for cataloging (step 1002). Then, the method includes cataloging the sayings, phrases, words, and utterances for authority access control (step 1004). Entities selected at as target entities (e.g., target entities 118) and utterances (e.g., utterances 119) are assigned access points (step 1006) for utterance harvest processing at utterance harvesting process portal (step 1008) on the web, semantic web, mobile devices, and the like. The association at a validation module (e., validation module 114) receives from utterance harvest processing products, i.e., referent codes and metadata "entities" (step 1010). The entities are evaluated and ranked (step 1012) with appellant entities and statistical matched to entities from (step 1004) and verified access points are released (step 1014). Referent codes & metadata and access points are placed as open un-linked entity content (step 1016) into an installed base (e.g., installed base 230).

It is important to appreciate that the artificial speech perception processing system 100 will always service the intelligent agent 252 operations, and the like contingent on preliminary building of the corpus of referent code & metadata "entities" operating with authority control in targeting 210 and an artificial method product function in the UHP 242. That is, an artificial method product is a proven, authentic, and with validated artificial entity references in the form of metadata and referent codes obtained in the operation of the UHP 242 utilizing masses of global appellants 229 contributing content which is preloaded with temporal cognitive information. That is, in the present invention, the automated and disambiguated waveform computer-encoding engine 226 of sayings, phrases, words and utterances, and the like are cognition rich with temporal references of accessible metadata validating the artificial string codes offering automated-tool content (step 907) in FIG. 9 for both users in artificial speech perception processing and information extraction processing and its devices in FIG. 8A. The categories of users listed above are not intended to be exhaustive.

Figure 11:
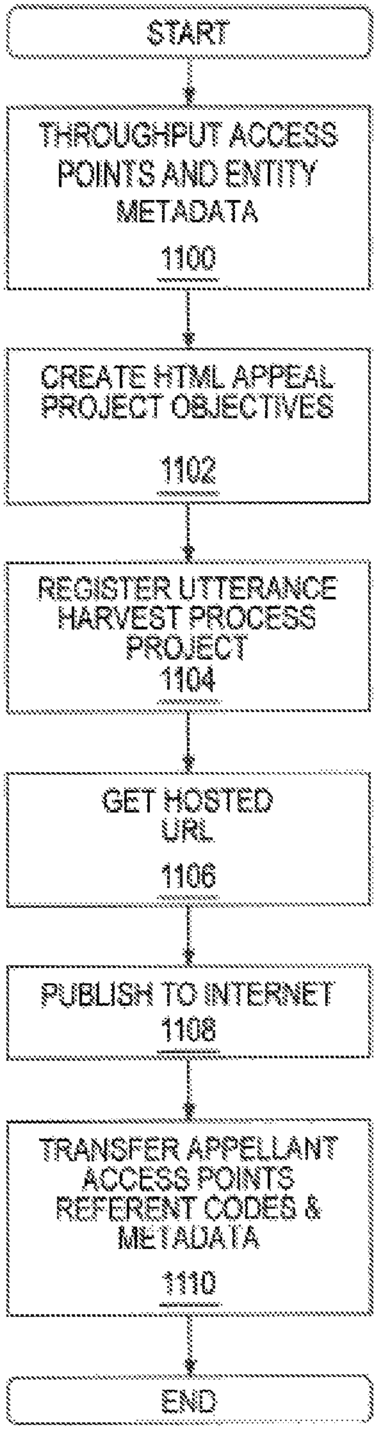
FIG. 11 is a flow chart outlining an example operation for harvesting the utterance harvesting process product derived artificial speech perception processing and harvesting associated metadata at the website and transferring the artificial code and metadata package in text form of natural language processing in accordance with one illustrative embodiment.

It is important to appreciate that an artificial method product operation shown in FIG. 11 depicts two existing an artificial methodology integrated at one time, i.e., library science cataloging access control metadata techniques and crowd sourcing operations at websites on the WEB.

FIG. 11 is a flow chart outlining an example an artificial method that starts with (step 1100) throughput access points and entity metadata in association 202 creates HTML appeals project (step 1102), registers utterance harvest process (UHP) (step 1104), obtains hosted URL (step 1106), publishes UHP appeals to internet (step 1108) and transfers mass appeal entities as referent codes & metadata and access points (step 1110) to pre-installed base 230 at the association 202.

It should be appreciated that, by design, the bio digital twin simulation for the "hearing ear" shown in FIG. 8B may, if equivalent to the operational function of the organ of Corti, that is, sorting out of frequencies at nerve cells, and a carrier system where back pulses may be extending from the primary auditory cortex for circuit loop purposes, then it may be envisioned that it may possibly be that a series of concepts comprises: bandpass filters (step 904), the siren comb (step 905), temporal time stamp (step 905), and comparator step (906) may constitute, as operational parts, artificial hearing and may be an illustrative embodiment of the theory of sigetic-semiology.

Artificial hearing, it is important to understand, may be the product from the waveform computer-encoding engine process, that is, that disambiguates what utterance or piece of music entity being processed through the operation of mimicking, creating codes strings to memory, and like an old fashioned player piano may make a record, however, not for a playback, but for mirroring the identity of the temporal instance, i.e., the referent codes & metadata that supply the cognition and meaning of the code. That is, as in FIG. 12 the column 1200 cybernetic operable notation outlines such a mimicry record of an entity 1201. The entity 1201, such as acoustic sound, is processed by waveform computer-encoding or substitution 1202, and the codes may be processed by intelligent programs for auto-translation 1203 to produce translations in MIDI, and the like, or devise statistical analytic system to analyze performance parameters such as color, timbre, and phrasing of the original entity.

Figure 12:
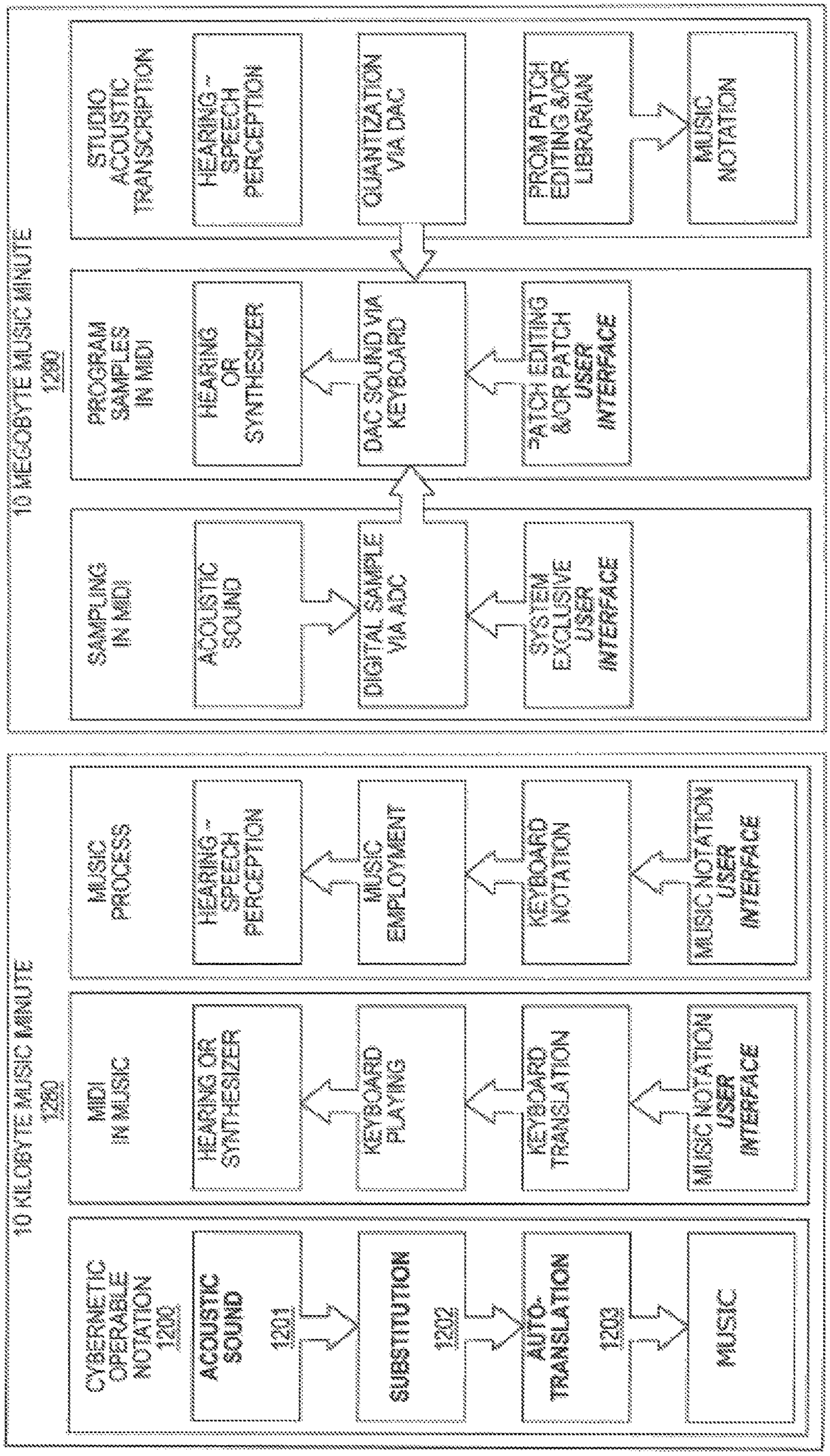
FIG. 12 is a block diagram of an example musical performance in intelligent agent real time application comparison in accordance with one illustrative embodiment.

And, it should be appreciated that in FIG. 12 the cybernetic operable notation is shown in block 1280 which represents real-time processing, i.e., low memory requirements.

It should be appreciated that while the above illustrative embodiments have been described in the context of a speech perception processing system creating temporal cognitive corpora of entities, the illustrative embodiments are not limited to such. Rather the illustrative embodiments may be implemented in any cognitive system that processes communication of natural and artificial phenomenon. For example, a system user may need assistance in identification of a word in a command application, where failed attempts persist without the illustrative embodiments, say a domestic restaurant location that uses a foreign language name for its establishment, with the present invention as its use in an embedded system as an assistive application the likelihood of the actual identification is greatly enhanced. That is, because natural language processing is part of the illustrative embodiments where licensed access points in the present invention and its installed base of entity "vocabulary" any real-time application with the embedded system may have access to rich referent code & metadata important to the identity of said restaurant in the command instance. The current state of the art for "command space" for correct answers is deficient in accuracy percentages, lagging well below what is believed to be correctness of question cognitive understanding. Other cognitive systems based on natural language processing of voice recognition, analog acoustic sound identification, visual image intake, or like content may also be augmented, enhanced, and restored with the mechanisms, an artificial method, and an artificial method product of the illustrative embodiments to authoritatively identify entities with regards to user and user systems in need of improvements to their respective technologies and ontologies.

As discussed above, while the example embodiments set forth in the Figures and described herein a primarily directed to creating a corpus of sayings, phrases, words, and utterances that are computer-encoded into digital speech perception substitution codes manifested as referent codes & metadata entities, the system comprises parts and entities are products of the whole system. That is, library science cataloging of access points are deliberated by an association of scholars and the like, which gives way to mass utterance harvesting on the internet, enabled by an invention capable of simulating cognitive processing of speech in an analogous hearing car configured in an embedded microprocessor unit, communicating in real-time to a validating process resulting in a rich installed base of automated-tool content created for users of multifold communication systems. That is, the system described above becomes an assistive tool to the state of the art of both Artificial Information gathering and AI, and the like. The opportunity for the present invention affords itself as an integrated system to operate in real-time whereas other harvesting scenarios may well have been prohibited by memory entry level bar 1290, as depicted in block diagram in FIG. 12, the memory requirement, in music minute terms has been in the magnitude of ten megabytes or more.

The description of the present invention has been presented for purposes of illustration and description and is not intended to be exhaustive or limited to the invention in the form disclosed. Many modifications and variations will be apparent to those of ordinary skill in the art without departing from the scope and spirit of the described embodiments. The embodiment was chosen and described to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

Empirical illustrative embodiments depicting individual observations, perceptions, and theoretical simulation models of coded speech will be discussed to support a new class of artificial speech perception processing 610. In contrast to hypothetical experimentation of theoretical concepts, the present body of the illustrative embodiments were observed experiences devoid of manipulation of parameter and environment. That said it should be appreciated that interpretations of meanings and ontological sources in the cognitive neural synapses, network, or any morphology are operationally relative in terms of temporal event instances as perceived by the author. That is, for example, in FIG. 13 heuristic no. 2 there are three blocks outlined which are linked in time and circumstance. The heuristic no. 2 comprises awareness of a composition (step 1301) of opening measures of a particular song, which is playing (step 1303) unaccountably "note-for-note" in the mind, yet the car is sensing (step 1304) actual acoustic rhythmic beats of an unknown origin.

The term operational refers to a set of circumstance, temporality, job, task, paradigm, and the like which is observed, perceived, and seen. That is, for example, a job might be what the organ of Corti is hearing in speech perception I.

It should be appreciated that none of the illustrative embodiments which follow are demonstratively or intentionally experienced, but rather through observable caprice.

The terms for primary auditory cortex and secondary auditory cortex are replaced with perception I and perception II respectively for purposes of clarification. That is, "I" designates acoustic sound that is analog sound which is heard where as "II" comprises perceptive memory and or perception as awareness implying meaning, and the like.

It should be appreciated that in the outlining of the flow charts the cascading downwards or upwards of events, i.e., changes of state depicted in steps comprises downward as successive and predictable cognitive events "heuristic" and the upward steps are categorically ballistic, i.e., change, not successive in cognitive awareness. The state of the art of brain science acknowledges brain recruitment as a functional process, however it is not the intention of the present invention to provide elaboration to the state of the art but to work within its spirit.

Figure 13:
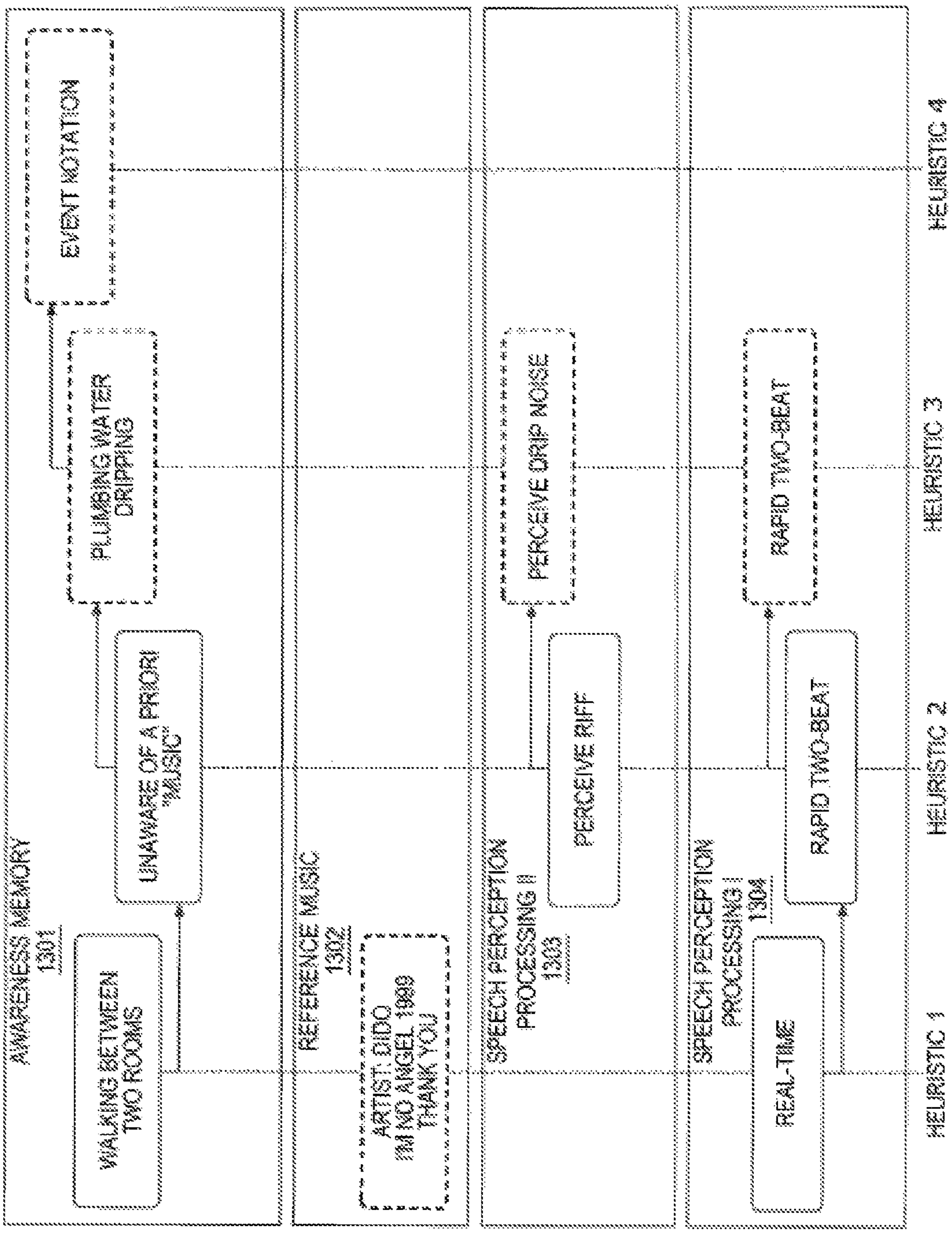
FIG. 13 is a flow chart outlining example observed temporal cognition of substitution principle in accordance with one illustrative embodiment.

FIG. 13 is a flow chart outlining an example of observed temporal cognition of substitution principle. It is important to understand that human hearing has integration with the brain function, cochlear nuclei function, and awareness which by convention is referred to as the mind. That is, in context for the present discussions of observations, perceptions, and theoretical model simulations, the part of the hearing system responsible for the integration for alertness, i.e., the "on" in the present invention may be termed "attention" or "anticipation," either irrespective of unconscious or conscious circumstances. The steps discussed above occurred in a point in time or heuristic no. 2, pointedly for the concept of a substitution principle, the reference song (step 1302), admittedly had been enjoyed frequently in the last week so it was in the circumstance of existing in short term memory terms "current," however, in heuristic no. 2, (step 1303), the perceived compositional riff was being used the undifferentiated "brain" to analyze, process, or make an accounting of the acoustic sound that the car was capturing, compounding any awareness was the fact that the acoustic sound in (step 1304) was being habituated or "ignored" hence the concept of substitution may be considered operational. By the time, heuristic no. 3, eyes and the cars were now close enough to the dripping water tank noise that habituation by the riff gave way to perceived dripping sounds (step 1303).

Figure 14:
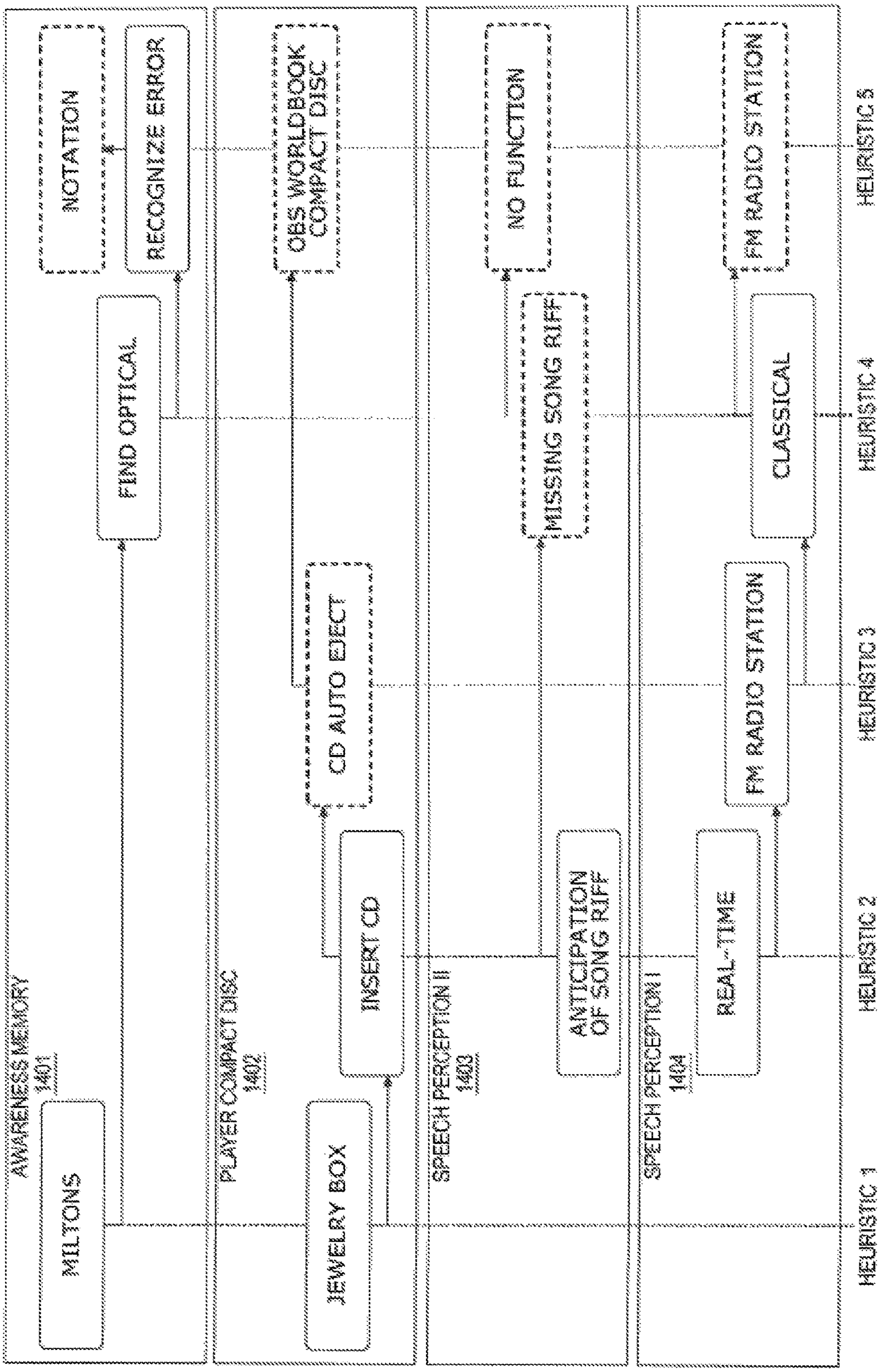
FIG. 14 is a flow chart outlining example observed temporal cognition of arbitration principle in accordance with one illustrative embodiment.

FIG. 14 is a flow chart outlining examples of observation in temporal cognition by way arbitration principle and substitution principle. The blocks in the flow chart corresponding heuristic no. 2 sets up the anticipation (step 1403) of first measures of a familiar music in the form of compact disc (step 1402). The descriptions relate to an environment of driving an automobile and attempts to listen to "Miltons." Immediately following insertion of the disc, a mechanical ejection of the disc occurs and in heuristic no. 3 the driver is unaware that radio sounds (step 1404) are in the cab of the car. The anticipation from heuristic no. 2 persists through heuristic no. 4 until arbitration principle is enacted i.e., (step 1401) visual confirmation is employed which identifies classic music on the radio. It should be appreciated that in heuristic no. 3 the anticipation initiated in heuristic no. 2 had been habituating over the music all along that may represent substitution principle operating until classic music became "heard" (step 1404) after visual confirmation (step 1401) in heuristic no. 4. This empirical example exists in fortune for the driver had been otherwise occupied doing the driving to observe the encyclopedia CD ROM being inserted into the player.

Figure 15:
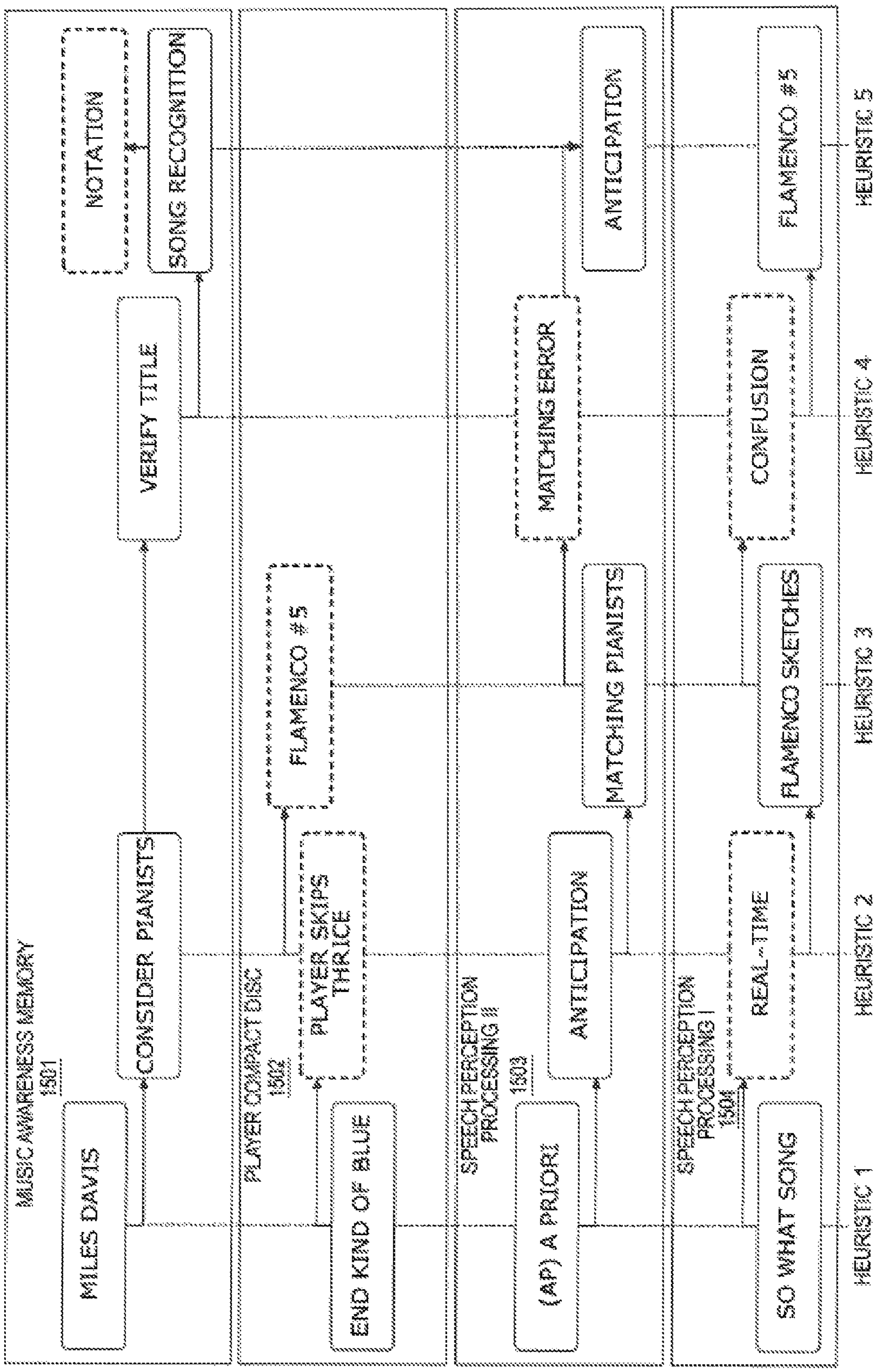
FIG. 15 is a flow chart outlining another example observed temporal cognition of arbitration principle in accordance with one illustrative embodiment.

FIG. 15 is a flow chart outlining an example of observation in temporal cognition by way of arbitration principle and substitution principle in a similar circumstance to the above. Briefly, it is in heuristic no. 3 that habituation over the music, i.e., disabling acknowledgement of the Flamenco Sketches representing substitution principle which may have occurred because of anticipation action in heuristic no. 2 (steps 1501, 1502, 1503). The perceptual present also described above may have echoic memory operating at heuristic no. 1 with the a priori memory of Freddy the Free Loader, the pianist identity, and the opening measures (step 1303) all culminating in confusion in heuristic no. 4 (step 1504). Here, vision title verification initiates the arbitration principle solving the confusion.

Figure 16:
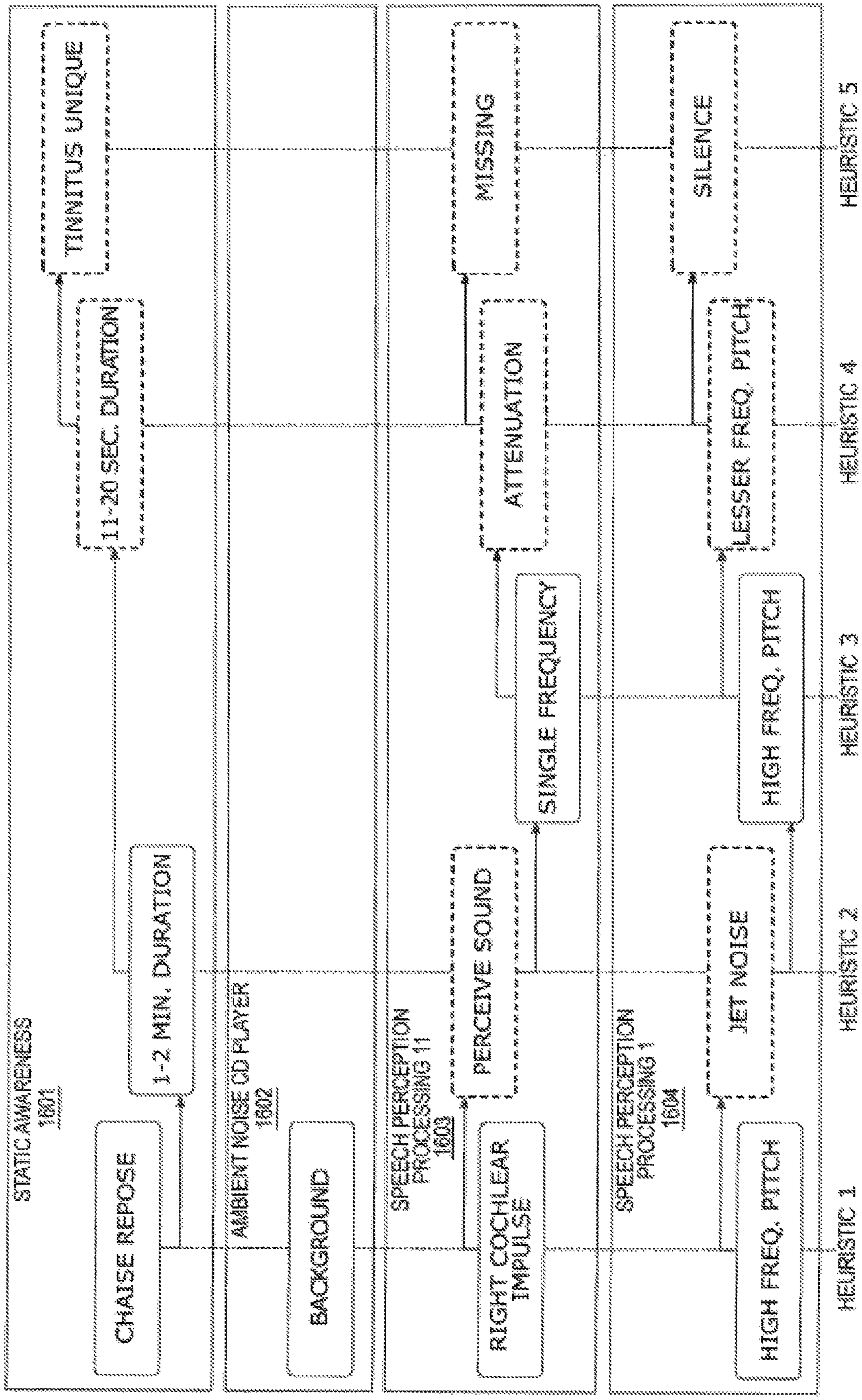
FIG. 16 is a flow chart outlining example observed temporal cognition of speech-in-noise substitution principle in accordance with one illustrative embodiment.

FIG. 16 is a flow chart outlining an example of observed temporal cognition of speech-in-noise substitution. The repose of the author is involved and the observation initiates after a third espresso is consumed comfortably on a deck chaise amidst classical English music on a CD player back inside the dwelling off the deck. In heuristic no. 1 the right cochlear nuclei (step 1603) is instantiated with high-pitched frequency impulse (step 1604) and background (step 1602) followed by what in heuristic no. 2 (step 1603) is a perception of sound from a jet aircraft with accompanying jet noise (step 1604). The awareness of duration (step 1601) of impulses in heuristic no. 2 in cochlear nuclei region for a perceived jet noise is one to two minutes (not uncommon for a fly over) with uninterrupted high pitch, until in heuristic no. 4, a lesser pitched frequency (step 1604) is attenuating (step 1603) for a period of eleven to twenty seconds duration (not uncommon for author's experience for tinnitus). The interpretation of the observation may be demonstrable of speech-in-noise substitution. That is, it is reasonable to assume that in (step 1603) where instantiation of perceived sound is dedicated to one side of the head that it may be the case that tinnitus was habituated by the high decibel jet noise until the fly over was completed. Or it may be possible tinnitus (step 1601) in heuristic no. 5 was a result of a triggering mechanism not presently the subject of this invention.

The disclosure also provides support for an artificial speech perception processing system, comprising: a waveform computer-encoding engine configured to generate referent code and metadata from inputted speech, an association including an installed base of utterances, and an utterance harvest process (UHP) configured to harvest the referent code and metadata, wherein the UHP is connected to the association and the referent code and metadata is tested against the installed base. In a first example of the system, the association includes a natural language processing engine for entity identification, cataloging, and target referencing. In a second example of the system, optionally including the first example, the installed base is coupled to one or more embedded systems for application of the referent code and metadata of the waveform computer-encoding engine. In a third example of the system, optionally including one or both of the first and second examples, the one or more embedded systems comprise proprietary hearing sciences, including bionics, hearing aids, and assistive devices, and intelligent agent, including assistive device technologies, assistive application software cybernetics and biometrics fields, and information communication technology. In a fourth example of the system, optionally including one or more or each of the first through third examples, the waveform computer-encoding engine is further configured to produce artificial substitution code for a bio digital twin of speech perception. In a fifth example of the system, optionally including one or more or each of the first through fourth examples, the waveform computer-encoding engine is configured to operate machine learning algorithms and natural language programming platforms.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A waveform computer-encoding engine, comprising an engine configured to produce procedural artificial automatic waveform computer-encoding of acoustic speech, the engine produces artificial substitution code for bio digital twin simulation of speech perception; and an artificial processing that comprises: automation, op amp amplifies incoming signal speech from microphone via mobile device, cell phone, information communication technology system, and the like; automation, signal channels then are duplicated; automation, each channel op amp operates as singularly-dedicated for each bandpass filter bank; automation, each or any array or arrays of banks of bandpass filters simultaneously receive signal from dedicated op amps; artificial automation, servo merged metadata and bio digital twin siren comb segments time-code words, via SMPTE, MIDI codes, or other temporal coding; artificial automation, servo synchronized comparators switch-on respective candidate bandpass filter from a respective bank; and artificial automation, switch-on identifies artificial substitution address codes and time-stamp stored in CMOS memory as artificial referent code and metadata.

2. The waveform computer-encoding engine of claim 1, wherein the engine is operationally speaking always on, and comprises metadata-equipped listening mode a.k.a. alert artificial automatic speech perception processor.

3. The waveform computer-encoding engine of claim 1, wherein the waveform computer-encoding engine always operates in a unique computer platform between machine language processing and artificial intelligent programming.

4. The waveform computer-encoding engine of claim 1, wherein waveform computer-encoding engine always generates SMPTE time-code words via a proprietary automatic artificial speech perception processing computer.

5. The waveform computer-encoding engine of claim 1, wherein waveform computer-artificial encoding engine always generates artificial automatic-tool content as temporal cognitive artificial referent code and metadata for corpora cataloging, proprietary hearing devices notwithstanding.

6. The waveform computer-encoding engine of claim 1, wherein waveform computer-artificial encoding engine always is natural language engine compliant for speech-to-text and text-to-speech processing comprising: SMPTE time-code words; metadata attributes in artificial utterance harvesting process forms; and contributed operational meta-data.

7. The waveform computer-encoding engine of claim 1, wherein waveform computer artificial encoding engine always generates artificial procedural steps as artificial measure and an artificial method to disambiguate variables.

8. The waveform computer-encoding engine of claim 2, wherein the engine is an artificial encoding engine which may operate in one or many layers on top of existing or future machine interpreter languages.

* * * * *